(12) United States Patent
Minakuchi et al.

(10) Patent No.: US 6,871,234 B1
(45) Date of Patent: Mar. 22, 2005

(54) INFORMATION DISTRIBUTION CONTROL SYSTEM, AND INFORMATION DISTRIBUTION CONTROL METHOD

(75) Inventors: Yu Minakuchi, Kanagawa (JP); Mitsuru Osawa, Kanagawa (JP); Takayuki Yamamoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/519,526

(22) Filed: Mar. 6, 2000

(30) Foreign Application Priority Data

Aug. 9, 1999 (JP) .......................................... 11-225741

(51) Int. Cl.⁷ .............................................. G06F 15/16
(52) U.S. Cl. ..................................................... 709/231
(58) Field of Search ................................ 709/231, 226, 709/232, 250, 234, 236, 223, 230

(56) References Cited

U.S. PATENT DOCUMENTS

| | | | | |
|---|---|---|---|---|
| 5,928,330 A | * | 7/1999 | Goetz et al. | ................. 709/231 |
| 6,061,731 A | * | 5/2000 | Blakeslee | ................... 709/231 |
| 6,085,252 A | * | 7/2000 | Zhu et al. | ................... 709/231 |
| 6,151,634 A | * | 11/2000 | Glaser et al. | ............... 709/236 |
| 6,154,771 A | * | 11/2000 | Rangan et al. | .............. 709/217 |
| 6,247,072 B1 | * | 6/2001 | Firestone | ..................... 710/53 |
| 6,263,371 B1 | * | 7/2001 | Geagan, III et al. | ......... 709/231 |
| 6,449,653 B2 | * | 9/2002 | Klemets et al. | ............. 709/231 |
| 6,453,355 B1 | * | 9/2002 | Jones et al. | .................. 709/230 |
| 6,466,592 B1 | * | 10/2002 | Chapman | .................... 370/537 |

FOREIGN PATENT DOCUMENTS

| | | | | |
|---|---|---|---|---|
| JP | 5236297 | 9/1993 | ............ | H04N/5/73 |
| JP | 10013811 | 1/1998 | ............ | H04N/7/16 |
| JP | 10187320 | 7/1998 | ............ | G06F/3/02 |

* cited by examiner

*Primary Examiner*—Glenton B. Burgess
(74) *Attorney, Agent, or Firm*—Greer, Burns & Crain, Ltd.

(57) ABSTRACT

In an information distribution control system, a sync control server adds a time stamp to the stream information JS capable of being reproduced in real time and adds the sync time information to the storage-type information JT, so that the stream information JS and the storage-type information JT are reproduced in temporal synchronism with each other based on the time stamp and the sync time information in a plurality of clients.

10 Claims, 14 Drawing Sheets

FIG.4A

J1 ; SERVER INFORMATION

| SERVER NAME | SERVER IP ADDRESS | MULTICAST ADDRESS | CONTENTS TYPE | CONTENTS NAME |
|---|---|---|---|---|
| STREAM SERVER | 11.2.3.100 | 239.0.10.100 | STREAM TYPE | CONTENTS A |
| STORAGE-TYPE INFORMATION SEVER | 11.2.3.199 | 239.0.10.199 | STORAGE TYPE | CONTENTS B |

FIG.4B

J2;CLIENT INFORMATION

| CLIENT NAME | CLIENT IP ADDRESS |
|---|---|
| CLIENT 1 | 22.33.44.100 |
| ⋮ | ⋮ |
| CLIENT m | 22.33.44.199 |

FIG.4C

J3 ; SYNC REPRODUCTION INFORMATION

| STREAM INFORMATION JS | | STORAGE-TYPE INFORMATION JT | | |
|---|---|---|---|---|
| SERVER NAME | CONTENTS NAME | SERVER NAME | CONTENTS NAME | SYNC TIME |
| STREAM SERVER | CONTENTS A | STORAGE-TYPE INFORMATION SERVER | CONTENTS B | 05'20 |

FIG.10

| STREAM INFORMATION JS | | STORAGE-TYPE INFORMATION JT | | |
|---|---|---|---|---|
| SERVER NAME | CONTENTS NAME | CLIENT NAME | CONTENTS NAME | SYNC TIME |
| STREAM SERVER | CONTENTS A | CLIENT 1 TO m | CONTENTS B | 05'20 |

J₄ ; SYNC REPRODUCTION INFORMATION

US 6,871,234 B1

INFORMATION DISTRIBUTION CONTROL SYSTEM, AND INFORMATION DISTRIBUTION CONTROL METHOD

FIELD OF THE INVENTION

The present invention relates to an information distribution control system, an information distribution control method, a computer readable recording medium for recording an information distribution control program, an information reproduction apparatus and a computer readable recording medium for recording an information reproduction control program used for distribution of stream information (animation data and audio data) capable of real time reproduction. More particularly, this invention relates to an information distribution control system, an information distribution control method, a computer readable recording medium for recording an information distribution control program, an information reproduction apparatus and a computer readable recording medium for recording an information reproduction control program capable of providing an information distribution service with a high added value.

BACKGROUND OF THE INVENTION

In recent years, an information distribution system for broadcasting live a lecture meeting or a concert in the same manner as the conventional TV broadcasting has been closely watched as the result of extension of internet and intranet. In this system, the stream information capable of real time reproduction by clients is generated from the image data and the audio data by the streaming technique, and this stream information is distributed to a plurality of clients at a time through a network. In keeping with this trend of multimedia, the providers of this information distribution service are seeking a service with a higher added value by carrying the scheme a step forward from the mere distribution of the stream information.

In the conventional internet or intranet environment, the use of an information distribution system for distributing the proceeding of a lecture meeting or a concert to receivers in real time as stream information (animation data and audio data) is extending. This information distribution system comprises a video camera and a microphone installed in the place of a lecture meeting or a concert hall, and a stream server for generating the stream information (contents information) capable of real time reproduction from the image data and the audio data produced by the video camera and the microphone, using the streaming technique, and distributing this stream information to a plurality of clients through a network.

A plurality of the clients receive the stream information and reproduce them in real time. This information distribution system, in which clients, if connected to the internet, can have the distribution of the stream information, has recently been closely watched.

The conventional information distribution system, as described above, is a system of broadcast type specialized in the distribution of the stream information capable of real time reproduction, and remains the same as the existing TV broadcast system in the sense that the contents information is reproduced in real time.

In the conventional information distribution system, as compared with the existing TV broadcast system, the access charge paid to the service provider for using the network is much higher than the charge paid for enjoying the TV broadcasting. On the contrary, the cost of the TV broadcast system is much lower than the access charge paid. As far as the service cost is concerned, therefore, the conventional information distribution system is still no match for the existing TV broadcasting system.

In view of this, the provider of the information distribution service using the information distribution system is in search for a high value-added service but not the mere distribution of the stream information. Under the circumstances, however, no service having a decisive factor capable of competing with the existing TV broadcasting system has yet to be offered.

SUMMARY OF THE INVENTION

It is an object of this invention to provide an information distribution control system, an information distribution control method, a computer readable recording medium for recording an information distribution control program, an information reproduction apparatus and a computer readable recording medium for recording an information reproduction control program capable of providing an information distribution service with a high added value.

In order to achieve the object described above, according to one aspect of the present invention, there is provided an information distribution control system comprising a first time information addition control unit which adds the first time information to the stream information capable of real time reproduction distributed from a stream information distribution apparatus to receivers, a second time information addition control unit which adds the second time information to the storage-type information distributed to the receivers, and a sync reproduction control unit which controls the receivers in such a manner as to reproduce the stream information and the storage-type information in temporal synchronism with each other based on the first time information and the second time information.

According to the above invention, the first time information is added to the stream information under the control of the first time information addition control unit, and the second time information is added to the storage-type information under the control of the second time information addition control unit. The stream information and the storage-type information are received by the receivers. In each of the receivers, the stream information and the storage-type information are reproduced in temporal synchronism with each other based on the first time information and the second time information under the control of the sync reproduction control unit.

As described above, both the stream information and the storage-type information are synchronously reproduced in the receivers, and therefore, as compared with the conventional case where the only the stream information is reproduced in real time, an information distribution service with a higher added value can be offered.

Further, the storage-type information is held in the stream information distribution apparatus, the second time information is added to the storage-type information by the second time information addition control unit, and the stream information distribution apparatus distributes the stream information with the first time information added thereto and the storage-type information with the second time information added thereto to the receivers through a network.

According to the above invention, the first time information is added to the stream information in the stream information distribution control apparatus under the control of the first time information distribution addition control unit and the second time information addition control unit, and the second time information is added to the storage-type information. The stream information and the storage-type information are received by the receivers. In each of the receivers, the stream information and the storage-type information are synchronously reproduced in temporal synchronism with each other based on the first time information and the second time information under the control of the sync reproduction control unit.

As descried above, the storage-type information is held in the stream information distribution apparatus so that the stream information and the storage-type information are distributed from the same stream information distribution apparatus, and therefore the effect of transmission delay can be reduced.

Further, there is provided a download unit which downloads the storage-type information in advance to the stream information distribution apparatus.

According to the above invention, the storage-type information is downloaded in advance to the stream information distribution apparatus by the download unit. In the stream information distribution control apparatus, the first time information is added to the stream information and the second time information is added to the storage-type information under the control of the first time information addition control unit and the second time information addition control unit. The stream information and the storage-type information are received by each of the respective receivers. In each of the receivers, the stream information and the storage-type information are synchronously reproduced in temporal synchronism with each other based on the first time information and the second time information under the control of the sync reproduction control unit.

As descried above, the storage-type information is downloaded in advance to the stream information distribution apparatus so that the stream information and the storage-type information are distributed from the same stream information distribution apparatus, and therefore the effect of the transmission delay can be reduced.

According to another aspect of the present invention, there is provided an information distribution control system comprising a time information addition control unit which adds the time information to the stream information capable of real time reproduction distributed to the receivers from the stream information distribution apparatus, and a sync reproduction control unit which controls the receivers in such a manner as to reproduce the stream information and the storage-type information held in the receivers in temporal synchronism with each other based on the time information.

According to the above invention, the time information is added to the stream information under the control of the time information addition control unit, after which the stream information is received by the receivers. In each of the receivers, the stream information received and the storage-type information held are synchronously reproduced in temporal synchronism with each other based on the time information under the control of the sync reproduction control unit.

As descried above, the stream information and the storage-type information are both synchronously reproduced in the receiver, and therefore as compared with the conventional case in which the stream information alone is reproduced in real time, an information distribution service with a high added value is offered. Further, the storage-type information is held in advance in the receivers, and therefore the storage-type information is not required to be transmitted, thereby eliminating the effect of the transmission delay.

Further, there is provided a download unit which downloads the storage-type information to the receivers in advance.

According to the above invention, the storage-type information is downloaded in advance to the receivers by the download unit, and in the stream information distribution control apparatus, the time information is added to the stream information under the control of the time information addition control unit, after which the stream information is distributed to the receivers. In each receiver, the stream information received and the storage-type information held are synchronously reproduced n temporal synchronism with each other based on the time information under the control of the sync reproduction control unit.

As descried above, the storage-type information are downloaded in advance to the receivers, and therefore the storage-type information is not required to be transmitted, thereby eliminating the effect of the transmission delay.

According to still another aspect of the present invention, there is provided an information distribution control system comprising a download unit which downloads in advance the storage-type information held in the stream information distribution apparatus to the storage-type information distribution apparatus, a first time information addition control unit which adds the first time information to the stream information capable of real time reproduction distributed to the receivers from the stream information distribution apparatus, a second time information addition control unit which adds the second time information to the storage-type information distributed from the storage-type information distribution apparatus to the receivers, and a sync reproduction control unit which controls the receivers in such a manner as to reproduce the stream information and the storage-type information in temporal synchronism with each other based on the first time information and the second time information.

According to the above invention, the storage-type information held in the stream information distribution apparatus are downloaded in advance to the storage-type information distribution apparatus by the download unit, and the first time information is added to the stream information under the control of the first time information addition control unit, while the second time information is added to the storage-type information under the control of the second time information addition control unit. The stream information and the storage-type information are received by the receivers. In each of the receivers, the stream information and the storage-type information are synchronously reproduced in temporal synchronism with each other based on the first time information and the second time information under the control of the sync reproduction control unit.

As descried above, both the stream information and the storage-type information are synchronously reproduced in the receivers, and therefore as compared with the prior art in which only the stream information is reproduced in real time, an information distribution service with a high added value can be provided.

According to still another aspect of the present invention, there is provided an information distribution control method comprising the first time information add control step of adding the first time information to the stream information capable of real time reproduction distributed from the stream information distribution apparatus to the receivers, the second time information add control step of adding the second time information to the storage-type information distributed to the receivers, and the sync reproduction control step of controlling the receivers in such a manner as to reproduce the stream information and the storage-type information in temporal synchronism with each other based on the first time information and the second time information.

According to the above invention, the first time information is added to the stream information in the first time information add control step and the second time information is added to the storage-type information in the second time information add control step. The stream information and the storage-type information are received by the receivers. The stream information and the storage-type information are synchronously reproduced in temporal synchronism with each other based on the first time information and the second time information in the sync reproduction control step.

As descried above, the stream information and the storage-type information are both synchronously reproduced in the receivers, and therefore as compared with the prior art in which only the stream information is reproduced in real time, an information distribution service with a high added value can be provided.

According to still another aspect of the present invention, there is provided a computer readable recording medium for recording an information distribution control program for permitting a computer to perform the operation comprising the first time information add control step of adding the first time information to the stream information capable of real time reproduction distributed to the receivers from the stream information distribution apparatus, the second time information add control step of adding the second time information to the storage-type information distributed to the receivers, and the sync reproduction control step of controlling the receivers in such a manner as to reproduce the stream information and the storage-type information in temporal synchronism with each other based on the first time information and the second time information.

According to the above invention, the first time information is added to the stream information in the first time information add control step, and the second time information is added to the storage-type information in the second time information add control step. The stream information and the storage-type information are received by the receivers. In the sync reproduction control step, the stream information and the storage-type information are synchronously reproduced in temporal synchronism with each other based on the first time information and the second time information.

As descried above, the stream information and the storage-type information are both synchronously reproduced in the receivers, and therefore as compared with the prior art in which only the stream information is reproduced in real time, an information distribution service with a high added value can be provided.

According to still another aspect of the present invention, there is provided an information distribution control system comprising a first receiver which receives the stream information capable of real time reproduction with the first time information added thereto, a second receiver for receiving the storage-type information with the second time information added thereto, and a sync reproduction unit which reproduces the stream information and the storage-type information in temporal synchronism with each other based on the first time information and the second time information.

According to the above invention, the stream information with the first time information added thereto is received by the first receiver and the storage-type information with the second time information added thereto is received by the second receiver. The sync reproduction unit synchronously reproduces the stream information and the storage-type information in temporal synchronism with each other based on the first time information and the second time information.

As described above, the stream information and the storage-type information are both synchronously reproduced in the receivers, and therefore as compared with the prior art in which only the stream information is reproduced in real time, an information distribution service with a high added value can be provided.

According to still another aspect of the present invention, there is provided a computer readable recording medium for recording an information reproduction control program for permitting a computer to execute the operation comprising the first receiving step of receiving the stream information capable of real time reproduction with the first time information added thereto, the second receiving step of receiving the storage-type information with the second time information added thereto, and the sync reproduction step of reproducing the stream information and the storage-type information in temporal synchronism with each other based on the first time information and the second time information.

According to the above invention, the stream information with the first time information added thereto is received in the first receiving step, and the storage-type information with the second time information added thereto is received in the second receiving step. In the sync reproduction step, the stream information and the storage-type information are synchronously reproduced in temporal synchronism with each other based on the first time information and the second time information.

As described above, the stream information and the storage-type information are both synchronously reproduced, and therefore as compared with the prior art in which only the stream information is reproduced in real time, an information distribution service with a high added value can be provided.

Other objects and features of this invention will become apparent from the following description with reference to the accompanying drawings.

BRIEF DESCRIPTION OF THE DRAWINGS

FIG. 4A to FIG. 4C show various information used in the first to sixth embodiments;

FIG. 10 is a diagram showing the sync reproduction information $J_4$ according to the third embodiment of the present invention;

DESCRIPTION OF THE PREFERRED EMBODIMENTS

Now, a detailed explanation will be given below of an information distribution control system, an information distribution control method, a computer readable recording medium for recording an information distribution control program, an information reproduction apparatus and a computer readable recording medium for recording an information reproduction control program according to first to sixth embodiments of the present invention with reference to the drawings.

Figure 1:
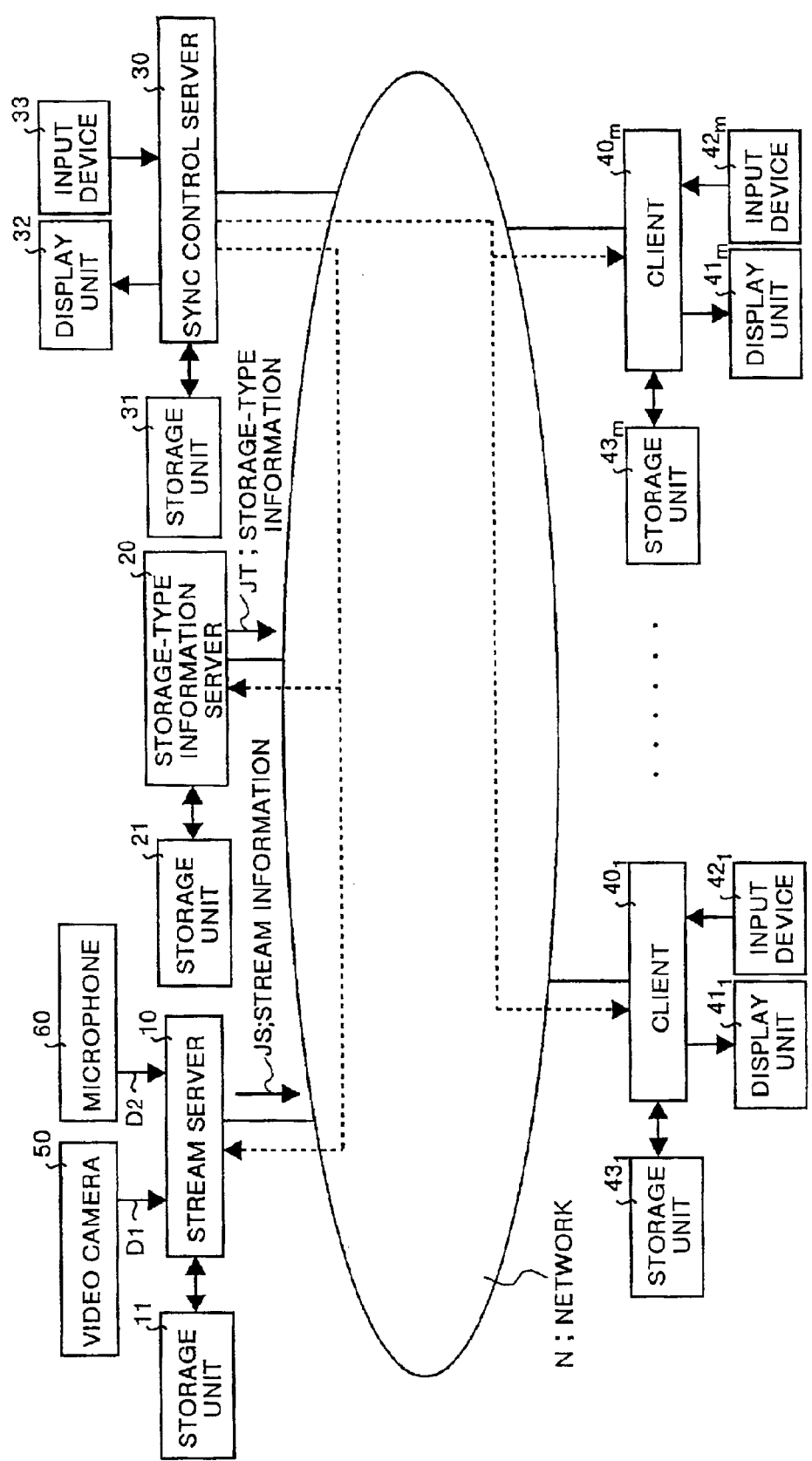
FIG. 1 is a block diagram showing a configuration according to first to sixth embodiments of the present invention.

FIG. 1 is a block diagram showing a configuration of a first embodiment of the present invention. In an information distribution system shown in FIG. 1, the stream information (animation data and audio data) are distributed in real time to a plurality of clients using the streaming technique, and the storage-type information are distributed to a plurality of clients, who reproduce the stream information and the storage-type information in temporal synchronism with each other. The storage-type information is defined as the information which is reproduced after being accumulated or stored in the client temporarily. In other words, the information distribution system is for providing contents by effectively combining the stream information and the storage-type information.

The description that follows refers to the case in which a multicast scheme is used as a communication method. The multicast scheme is a communication method in which information is transmitted to a plurality of specified clients at a time and is called a specified-group broadcast communication scheme. Further, the information distribution system finds application in the live broadcast of a lecture meeting or a concert due to its capability of real time reproduction.

The network N shown in FIG. 1 is a LAN (local area network), an intranet, an internet, etc. for transmitting the stream information JS, the storage-type information JT described later, etc. This network N is connected with a stream server 10, a storage-type information server 20 and a sync control server 30 installed on the distributor side and clients $40_1$ to $40_m$ (m≧n) installed on the user (receiver) side.

The stream server 10 generates the stream information JS with a time stamp attached thereto, which information JS is distributed to the clients $40_1$ to $40_m$ under the control of the sync control sever 30. The time stamp is the time information used for synchronous reproduction of the stream information JS and the storage-type information JT. The stream information JS, on the other hand, is the information on contents including animation data and audio data compressed with a stream band, a frame rate, a screen size, etc. as parameters. The stream band is an occupied transmission band for transmitting the stream information JS to the network N. The frame rate is the number of screens per second of the stream information reproduced in real time by the clients $40_1$ to $40_m$. The larger the frame rate, the smoother reproduction of the animation is possible. A large frame rate, however, requires a correspondingly wider stream band. The screen size is defined as the number of pixels (number of vertical pixels multiplied by the number of horizontal pixels) making up the stream information reproduced in real time on the user side.

A storage unit 11 is a hard disk unit, for example, used as a main memory for the stream server 10. A video camera 50 is installed in the place where a lecture meeting or a concert is held for picking up real time images of the proceeding of the lecture meeting or the concert, as the case may be, and outputs the result of imaging to the stream server 10 as animation data $D_1$. In similar fashion, a microphone 60 is installed in the place where a lecture meeting or a concert is held. The microphone 60 converts the voice of the lecturer or the sound in the concert hall into audio data $D_2$ and outputs it to the stream server 10 in real time.

Figure 2:
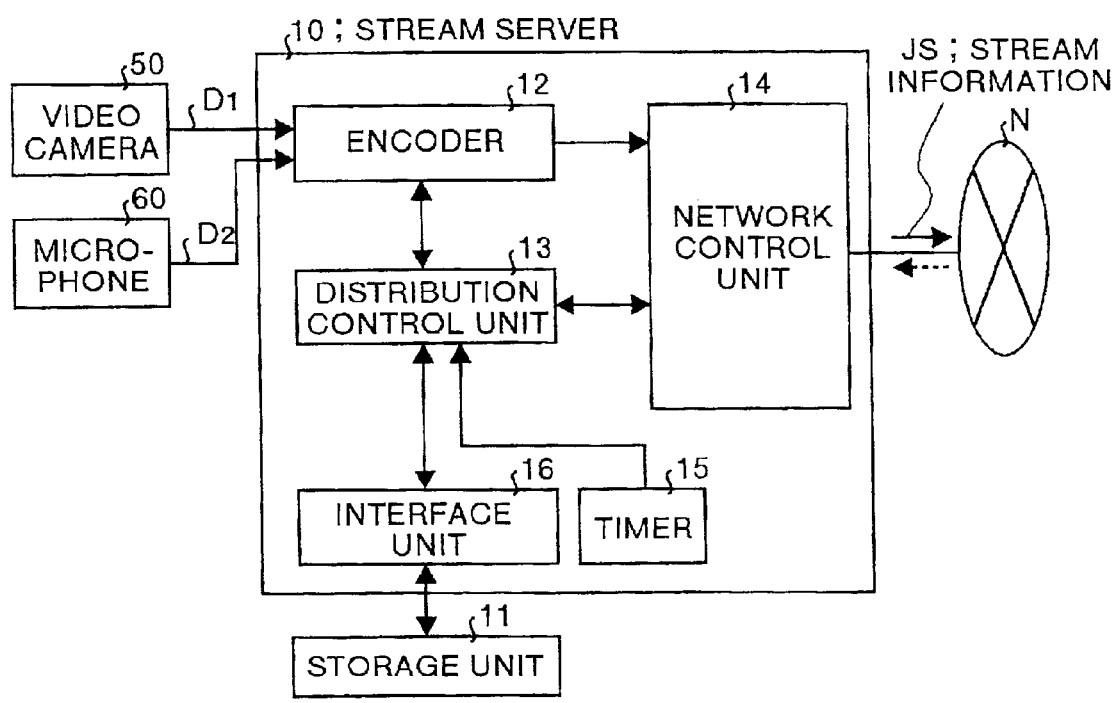
FIG. 2 is a block diagram showing a configuration of a stream server 10 shown in FIG. 1.

A configuration of the stream server 10 described above will be described in detail with reference to FIG. 2. In FIG. 2, the component parts corresponding to the parts of FIG. 1 are designated by the same reference numerals, respectively. In the stream server 10 shown in FIG. 2, an encoder 12 generates the stream information JS by encoding the animation data $D_1$ and the audio data $D_2$ captured by the video camera 50 and the microphone 60, based on the parameters including the stream band, the frame rate, the screen size, etc. described above.

Specifically, the encoder 12 converts the animation data $D_1$ and the audio data $D_2$ into digital data and then, taking the screen size, the frame rate, etc. into account, reduces the information amount of the digital data. Further, the encoder 12 compresses the digital data in real time using the codec technique and thus generates the stream information JS with the animation data $D_1$ and the audio data $D_2$ synchronized with each other.

The distribution control unit 13 controls the distribution of the stream information JS (contents) and notifies the clients $40_1$ to $40_m$ of the distribution of the contents. The operation of the distribution control unit 13 will be described in detail later. The network control unit 14 has the function of transmitting the stream information JS to the network N at a transfer rate corresponding to the transmission band of the network N using a distribution protocol. The network control unit 14 also has the buffering function of storing the stream information JS in the case where a transmission loss of the stream information JS occurs due to the congestion of the network N. The timer 15 outputs the time count to the distribution control unit 13. The interface unit 16 acts as an interface between the distribution control unit 13 and the storage unit 11.

Returning to FIG. 1, the storage-type information server 20 distributes the storage-type information JT with the sync time information attached thereto to the clients $40_1$ to $40_m$ under the control of the sync control server 30. The sync time information is the information on the relative time used for sync reproduction of the stream information JS and the storage-type information JT. The storage-type information JT is the information reproduced after being stored in the clients $40_1$ to $40_m$ and include still image data, text data, etc. The storage unit 21 has the function as a main memory of the storage-type information server 20 and stores the storage-type information JT.

The sync control server 30 controls the distribution of the stream information JS and the storage-type information JT in the stream server 10 and the storage-type server 20 based on the server information $J_1$ and the client information $J_2$ shown in FIG. 4A and FIG. 4B. The sync control server 30 also controls the sync reproduction of the stream information JS and the storage-type information JT in the clients $40_1$ and $40_m$ based on the sync reproduction information $J_3$ shown in FIG. 4C. The operation of the sync control server 30 will be described in detail later.

The server information $J_1$ shown in FIG. 4A is the information on the stream server 10 and the storage-type information server 20, and includes "server name", "server IP (internet protocol) address", "multicast address", "contents type" and "contents name". The "server name" is the name of the stream server 10 and the storage-type information server 20. In the case shown in FIG. 4A, "stream server" is the name of the stream server 10. The "storage-type information server" is the name of the storage-type information server 20.

The "server IP address" is the IP address of the stream server 10 and the storage-type information server 20, respectively. In the shown case, the "server IP address" of the stream server 10 is "11.2.3.100", and the "server IP address" of the storage-type information server 20 is "11.2.3.199". The "multicast address" is the address assigned to the multicast group (specific group) existing on the network N and used as a distribution IP address for distributing the stream information JS and the storage-type information JT to the multicast group.

Specifically, the "multicast address" of the stream server 10 is "239.0.10.100" which is an address assigned to the multicast group configured of the clients $40_1$ to $40_m$, for example. In the case where the stream information JS is distributed to the multicast address "239.0.10.100", for example, the stream information JS is distributed to the clients $40_1$ to $40_m$ (multicast group).

In similar fashion, the "multicast address" of the storage-type information server 20 is "239.0.10.199", which is an address assigned to the multicast group configured of the clients $40_1$ to $40_m$, for example. In the case where the storage-type information JT is distributed to the multicast address "239.0.10.199", for example, the storage-type information JT is distributed to the clients $40_1$ to $40_m$ (multicast group).

The "contents type" represents the type of the contents supplied from the stream information JS and the storage-type information JT. In the case shown, the "contents type" of the stream information JS is "stream type", and the "contents type" of the storage-type information JT is "storage type". The "contents name" is the name of the contents supplied from the stream information JS and the storage-type information JT. In the case shown, the "contents name" for the stream information JS is "contents A", and the "contents name" for the storage-type information JT is "contents B".

The client information $J_2$ shown in FIG. 4B is the information ("client name", "client IP address") on the clients $40_1$ to $40_m$. The "client name" is each name of the clients $40_1$ to $40_m$. In the shown case, they are "client 1" to "client m". The "client IP address" is the IP address assigned to each of the clients $40_1$ to $40_m$, and in the shown case, "22.33.44.100" to "22.33.44.199", respectively.

The sync reproduction information $J_3$ shown in FIG. 4C is the information used for sync reproduction of the stream information JS and the storage-type information JT. Specifically, as for "stream information JS", "stream server" is defined as "server name" and "contents A" is defined as "contents name". In similar fashion, as for "storage-type information JT", "storage-type information server" is defined as "server name", "contents B" as "contents name", and "05'20" (5 minutes and 20 seconds) as "sync time". The "sync time" is the relative time used for sync reproduction of the stream information JS and the storage-type information JT.

Returning to FIG. 1, the storage unit 31 stores the server information $J_1$ to $J_3$ described above. A display unit 32 includes a display unit such as a CRT (cathode-ray tube) or a LCD (liquid crystal display), and an audio output unit such as a preamplifier or a speaker for displaying an image and reproducing audio information required for controlling the sync reproduction. An input device 33 is an input device such as a mouse or a keyboard.

Figure 3:
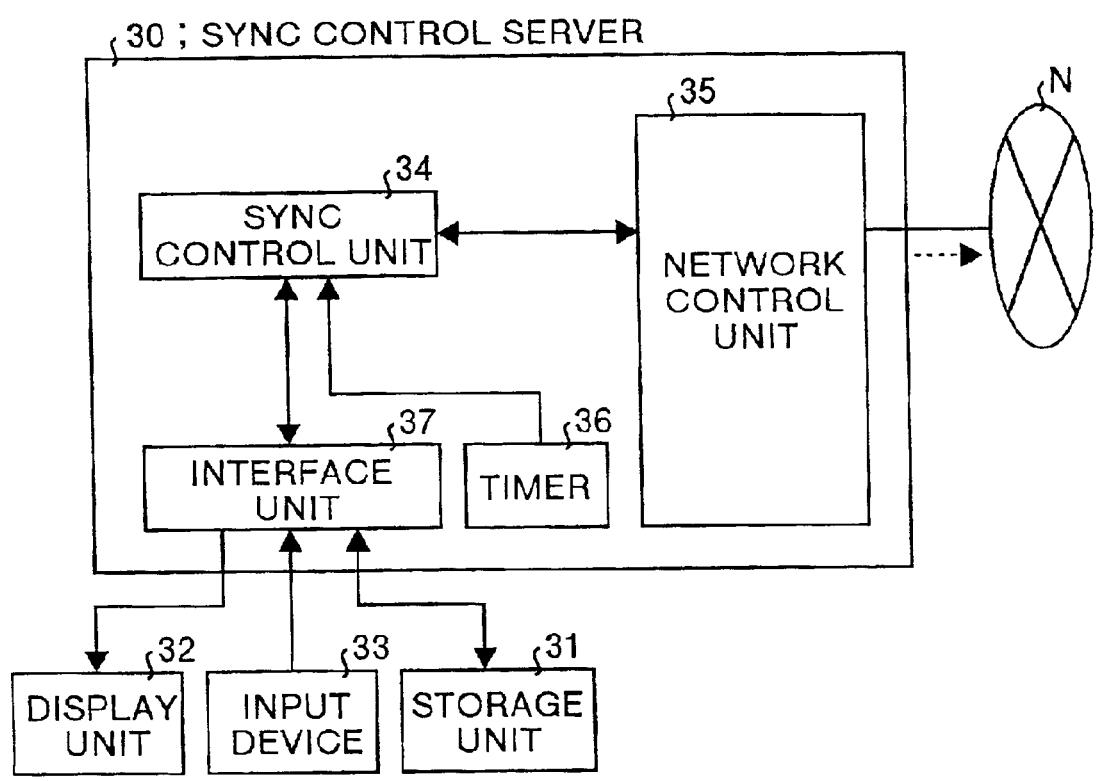
FIG. 3 is a block diagram showing a configuration of a sync control server 30 shown in FIG. 1.

The configuration of the sync control server 30 described above will be explained with reference to FIG. 3. In FIG. 3, the component parts corresponding to the respective parts in FIG. 1 are designated by the same reference numerals, respectively. The sync control unit 34 controls the sync reproduction of the information including the storage-type information JT and the stream information JS based on the server information $J_1$ to the sync reproduction information $J_3$ (see FIG. 4A to FIG. 4C). The operation of the sync control unit 34 will be described in detail later. The network control unit 35 controls the communication between the stream server 10, the storage-type information server 20 and the clients $40_1$ to $40_m$, for example, in accordance with the TCP/IP (transmission control protocol/internet protocol). The timer 36 outputs the time count to the sync control unit 34. The timer 36 and the timer 15 shown in FIG. 2 are synchronized with each other. The interface unit 37 provides an interface between the sync control unit 34, the storage unit 31, the display unit 32 and the input device 33.

Returning to FIG. 1, the clients $40_1$ to $40_m$ synchronously reproduce the stream information JS and the storage-type information JT distributed through the network N from the stream server 10 and the storage-type information server 20, respectively, under the control of the sync control server 30. Specifically, the clients $40_1$ to $40_m$ reproduce the stream information JS in real time, and reproduces the storage-type information JT when the time after the sync reproduction of the stream information JS has reached the "sync time" (for example, 05'20) shown in FIG. 4C.

The display units $41_1$ to $41_m$ each include a display unit such as a CRT or LCD and an audio output unit such as a preamplifier or a speaker. The display unit displays an animation when the stream information JS is reproduced in real time, and displays a still image or the like when the storage-type information JT is reproduced. The audio output unit, on the other hand, outputs audio information when the stream information JS is reproduced in real time. The input units $42_1$ to $42_m$ are each a mouse, a keyboard or the like input device. The storage units $43_1$ to $43_m$ store (accumulate) the storage-type information JT distributed from the storage-type information server 20.

Figure 5:
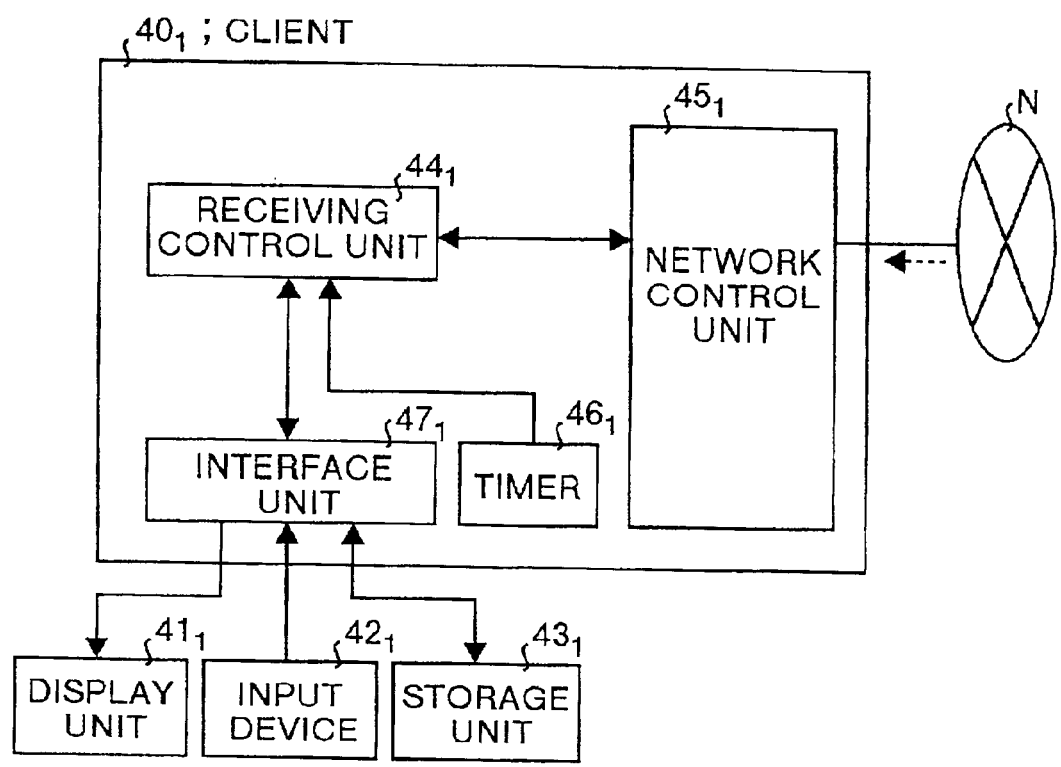
FIG. 5 is a block diagram showing a configuration of a client $40_1$ shown in FIG. 1.

The configuration of the client $40_1$ described above will be explained in detail below with reference to FIG. 5. In FIG. 5, those component parts corresponding to the parts in FIG. 1 are designated by the same reference numerals, respectively. The receiving control unit $44_1$ shown in FIG. 5 controls the receiving operation and the sync reproduction of the stream information JS and the storage-type information JT distributed. The operation of the receiving control unit $44_1$ will be described in detail later. The network control unit $45_1$ controls the communication with the stream server 10 and the storage-type information server 20 according to the distribution protocol.

The network control unit $45_1$ also controls the communication with the sync control server 30 in accordance with TCP/IP. The timer $46_1$ outputs the time count to the receiving control unit $44_1$. The interface unit $47_1$ provides an interface between the receiving control unit $44_1$, the display unit $41_1$, the input unit $42_1$ and the storage unit $43_1$. The configuration of the other clients $40_2$ (not shown) to $40_m$ is the same as that of the client $40_1$ described above.

Figure 6:
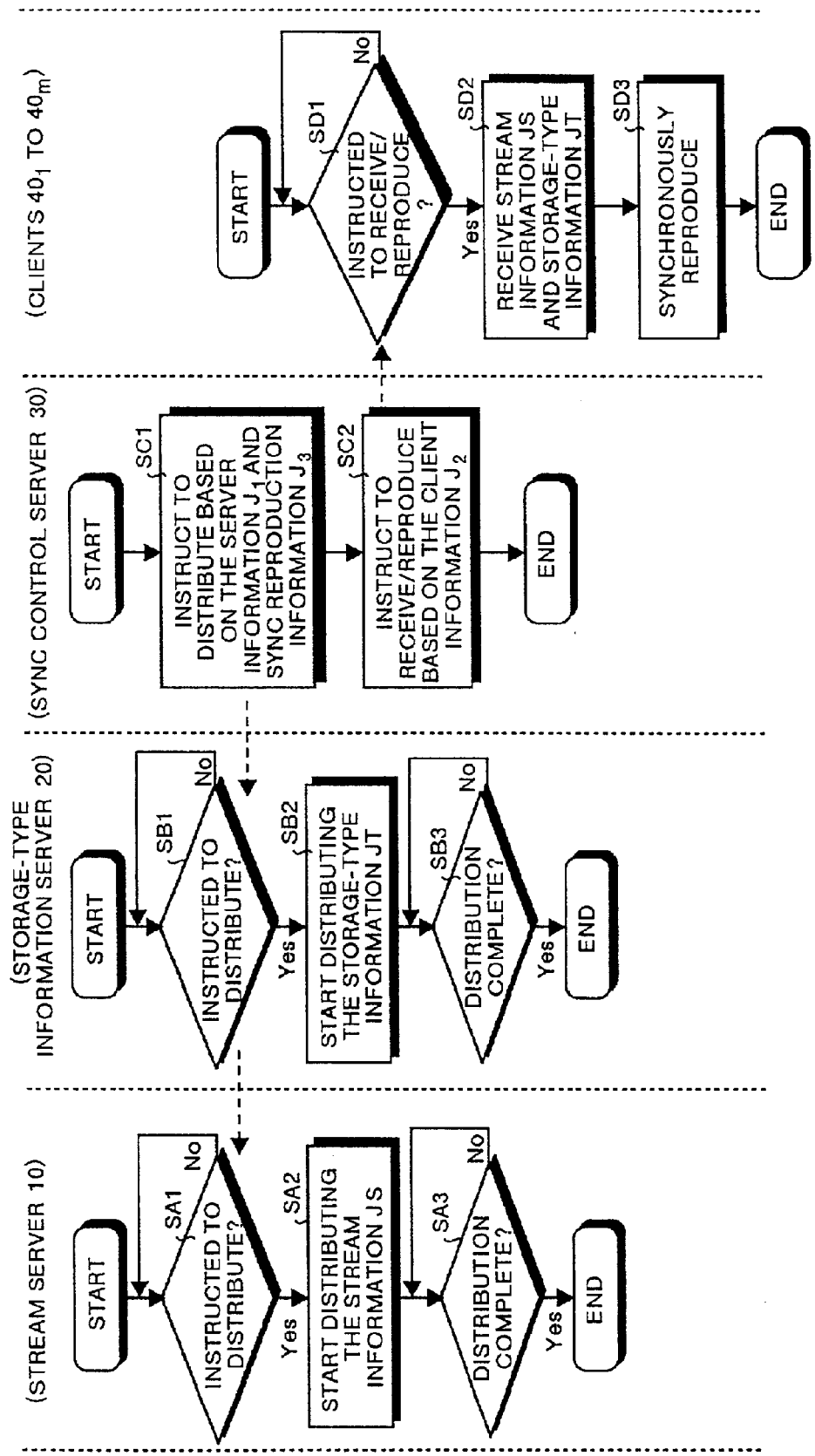
FIG. 6 is a flowchart for explaining a first example of the operation according to the first embodiment of the present invention.

Now, the first example of the operation of the first embodiment will be explained with reference to the flowchart shown in FIG. 6. In FIG. 1, once the stream server 10, the storage-type information server 20 and clients $40_1$ to $40_m$ are activated, the process proceeds to steps SA1, SB1 and SD1, respectively, shown in FIG. 6. In step SA1, the distribution control unit 13 of the stream server 10 shown in FIG. 2 determines whether the sync control server 30 has instructed to distribute the stream information JS or not. In the case under consideration, the answer is NO and the same process of determination is repeated.

In similar manner, in step SB1, the storage-type information server 20 determines whether the sync control server 30 has instructed to distribute the storage-type information JT or not. In the case under consideration, the answer is NO, and the same process of determination is repeated. Further, in step SD1, the clients $40_1$ to $40_m$ determine whether the sync control server 30 has given a receive/reproduce instruction or not. In the case under consideration, the answer is assumed to be NO and the same process of determination is repeated. In the description that follows, reference is primarily made to the operation of the client $40_1$ shown in FIG. 5 since the operation of the clients $40_2$ (not shown) to $40_m$ is similar to that of the client $40_1$.

In step SD1, the receiving control unit $44_1$ of the client $40_1$ shown in FIG. 5 determines whether the sync control server 30 has given a receive/reproduce instruction or not. The receive/reproduce instruction concerns an instruction to receive the stream information JS and the storage-type information JT and to synchronously reproduce the stream information JS and the storage-type information JT.

Upon receipt of the information that the distributor has instructed to start distribution using the input unit 33 shown in FIG. 3, the sync control unit 34 of the sync control server 30 proceeds to step SC1. In step SC1, the sync control unit 34 first reads the server information $J_1$ and the sync reproduction information $J_3$ shown in FIG. 4A and FIG. 4C from the storage unit 31. Then, the sync control unit 34 recognizes the information ("server name", "contents name", "sync time") on the stream information JS and the storage-type information JT to be synchronously reproduced from the sync reproduction information $J_3$.

In this case, the sync control unit 34 recognizes "stream server" (stream server 10) and "contents A" as the information on the stream information JS, and "storage-type information server" (storage-type information server 20), "contents B" and "05'20" (sync time) as the information on the storage-type information JT. Then, the sync control unit 34 recognizes "stream server" (stream server 10) and "storage-type information server" (storage-type information server 20) for distributing the stream information JS and the storage-type information JT, respectively, from the server information $J_1$.

Further, the sync control unit 34 recognizes "multicast address" (239.0.10.100) of the destination of distribution of the stream information JS and "multicast address" (239.0.10.199) of the destination of distribution of the storage-type information JT from the server information $J_1$. Then, the sync control unit 34 instructs the stream server 10 through the network N to distribute the stream information JS for "contents A" to the multicast address "239.0.10.100". In parallel to this instruction, the sync control unit 34 instructs the storage-type information server 20 through the network N to transmit the storage-type information JT for "contents B" to the multicast address "239.0.10.199" and to set the sync time at "05'20", after which the process proceeds to step SC2.

As a result, the distribution control unit 13 of the stream server 10 shown in FIG. 2 determines the answer in step SA1 as YES and proceeds to step SA2. In step SA2, the distribution control unit 13 starts distributing the stream information JS for "contents A". Specifically, the animation data $D_1$ and the audio data $D_2$ for "contents A" are output from the video camera 50 and the microphone 60, respectively. Once the animation data $D_1$ and the audio data $D_2$ are captured by the encoder 12, the encoder 12 encodes and compresses the animation data $D_1$ and the audio data $D_2$ based on the parameters including the stream band and thereby generates the stream information JS.

The distribution control unit 13 transmits the stream information JS with a time stamp attached thereto through the network control unit 14 and the network N to the multicast address "239.0.10.100" (see FIG. 4A) based on the time count of the timer 15, after which the process proceeds to step SA3. As a result, the stream information JS with a time stamp attached thereto is distributed to the clients $40_1$ to $40_m$, respectively, corresponding to the multicast address "239.0.10.100". The time stamp attached to the stream information JS is the information constantly changing according to the time count on the timer 15. In step SA3, the distribution control unit 13 determines whether the distribution of the stream information JS is completed or not, and the result of determination is kept at NO until the distribution is completed.

Upon receipt of an instruction from the sync control unit 34 of the sync control server 30, on the other hand, the storage-type information server 20 determines the answer in step SB1 as YES, and proceeds to step SB2. In step SB2, the storage-type information server 20 first reads the storage-type information JT from the storage unit 21. Then, the storage-type information server 20 transmits the storage-type information JT with the sync time information attached thereto corresponding to the sync time ("05'20", see FIG. 4C) designated by the sync control unit 34 to the multicast address "239.0.10.199" (see FIG. 4A) through the network N, after which the process proceeds to step SB3.

As a result, the storage-type information JT with the sync time information attached thereto is distributed to the clients $40_1$ to $40_m$ corresponding to the multicast address "239.0.10.199". The sync time information ("05'20") attached to the storage-type information JT is a constant value. In step SB3, the storage-type information serve 20 determines whether the distribution of the storage-type information JT is complete or not, and keeps the result of determination at NO until the distribution is complete.

In step SC2, on the other hand, the sync control unit 34 of the sync control server 30 shown in FIG. 3 reads the client information $J_2$ (see FIG. 4B) from the storage unit 31, and then gives a receive/reproduce instruction to the IP addresses "22.33.44.100" to "22.33.44.199" obtained from the client information $J_2$, i.e. the clients $40_1$ to $40_m$, respectively. The receive/reproduce instruction is the one to receive the stream information JS transmitted to the multicast address "239.0.10.100", to reproduce the stream information JS in real time, to receive the storage-type information JT transmitted to the multicast address "239.0.10.199", and to synchronously reproduce the storage-type information JT and the stream information JS at the same time point ("05'20").

Upon receipt of the receive/reproduce instruction, the receiving control unit $44_1$ of the client $40_1$ shown in FIG. 5 determines the answer in step SD1 as YES, and proceeds to step SD2. In step SD2, the receiving control unit $44_1$ starts receiving the stream information JS transmitted to the multicast address "239.0.10.100". In similar fashion, the receiving control unit $44_1$ starts receiving the storage-type information JT transmitted to the multicast address "239.0.10.199", and stores (accumulates) the received storage-type information JT in the storage unit $43_1$ through the interface unit $47_1$.

In step SD3, the receiving control unit $44_1$ performs the process of synchronously reproducing the stream information JS and the storage-type information JT. Specifically, the receiving control unit $44_1$ generates the animation data and the audio data by restoring the stream information JS, and then supplies the animation data and the audio data to the display unit $41_1$ through the interface unit $47_1$. As a result, the animation and audio data for "contents A" are reproduced in the display unit $41_1$. Further, based on the time stamp added to the stream information JS, the receiving control unit $44_1$ determines a reference time at the time point when the real time reproduction of the stream information JS is started (hereinafter referred to as the real time reproduction start time).

During the real time reproduction of the stream information JS, the receiving control unit $44_1$ monitors whether the relative time point based on the real time reproduction start time coincides with the sync time point ("05'20") added to the storage-type information JT. Once the relative time point comes to coincide with the sync time point ("05'20"), the receiving control unit $44_1$ outputs the storage-type information JT stored (accumulated) in the storage unit $43_1$ to the display unit $41_1$. In the display unit $41_1$, the storage-type information JT is synchronized with the stream information JS and then the storage-type information JT for "contents B" is synchronously reproduced. Then, a second example of the operation of the first embodiment will be explained with reference to the flowchart shown in FIG. 7. In the second example of operation, assume that the distributor (lecturer) holds a lecture meeting using a teaching material and the proceeding of the lecture meeting is broadcast live. Specifically, in the description that follows, reference is made to the case in which the animation and audio data for the lecture meeting are distributed as the stream information JS ("contents A", see FIG. 4A) to the clients $40_1$ to $40_m$ on the one hand, and the storage-type information JT ("contents B", see FIG. 4A) for the teaching material are distributed to the clients $40_1$ to $40_m$ on the other hand.

In the second example of operation, therefore, the still image data for the teaching material are stored in advance as the storage-type information JT by page in the storage unit 21 shown in FIG. 1. On the other hand, the storage-type information distribution control program is stored in the storage unit 31 beforehand, and the sync control server 30 controls the distribution of the storage-type information JT by executing the storage-type information distribution control program.

Figure 7:
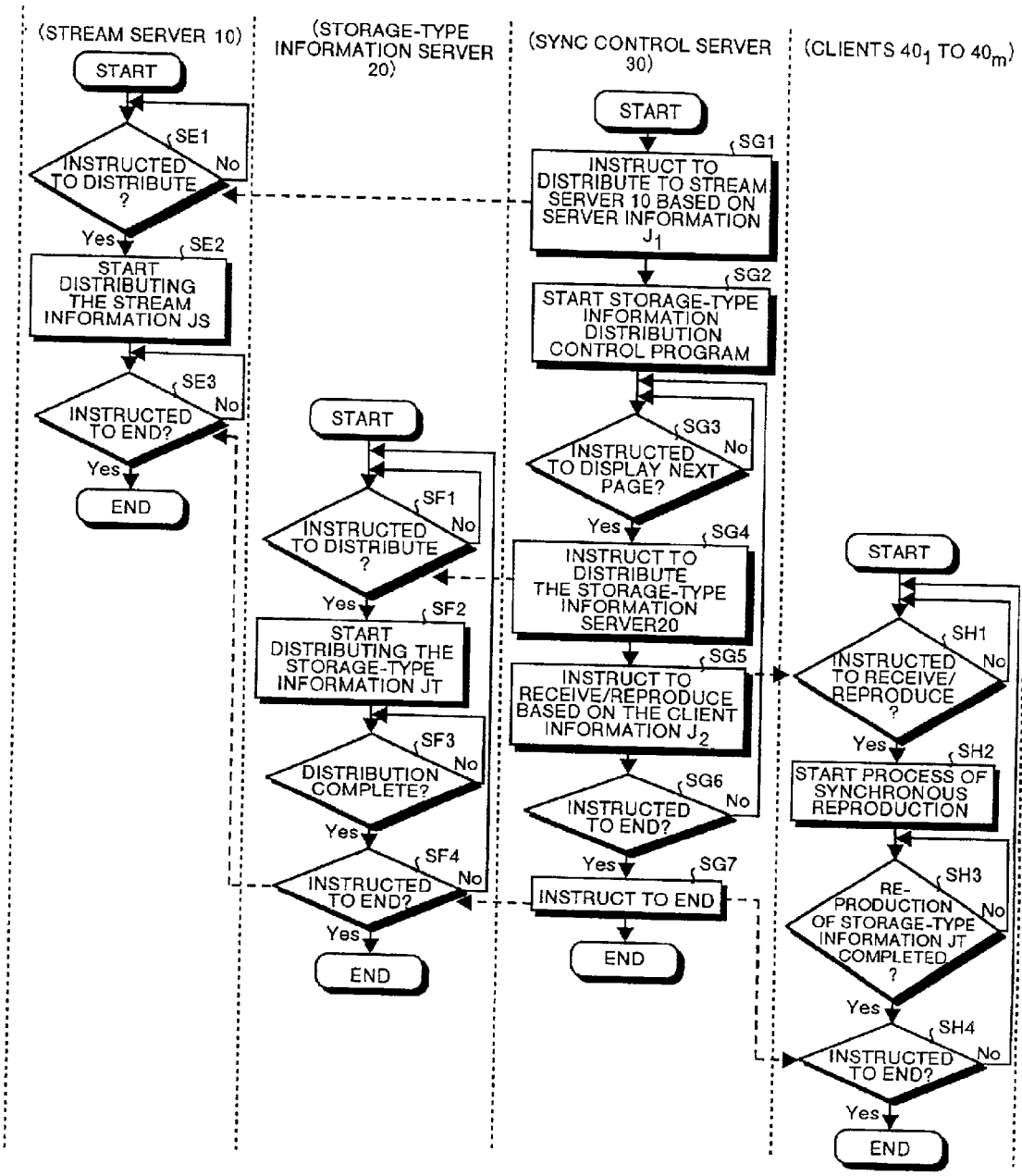
FIG. 7 is a flowchart for explaining a second example of the operation according to the first embodiment.

In FIG. 1, the stream server 10, the storage-type information server 20 and the clients $40_1$ to $40_m$, once activated, proceed to steps SE1, SF1 and SH1, respectively, shown in FIG. 7. Thus, as in the first example of operation described above, the distribution control unit 13 of the stream server 10 shown in FIG. 2 determines in step SE1 whether the sync control server 30 has given an instruction to distribute the stream information JS or not, and the storage-type information server 20 determines in step SF1 whether the sync control server 30 has given an instruction to distribute the storage-type information JT or not. In step SH1, on the other hand, the clients $40_1$ to $40_m$ determine whether the sync control server 30 has given a receive/reproduce instruction or not.

When the distributor inputs the information instructing the stream information JS to be distributed using the input device 33 shown in FIG. 3, the sync control unit 34 of the sync control server 30 proceeds to step SG1. In step SG1, the sync control unit 34 first reads the server information $J_1$ shown in FIG. 4A from the storage unit 31. Then, the sync control unit 34, as in the first example of operation, recognizes the "multicast address" ("239.0.10.100") of the destination of distribution of the stream information JS from the server information $J_1$. Then, the sync control unit 34 instructs the stream server 10 through the network N to distribute the stream information JS for "contents A" to the multicast address "239.0.10.100", and then proceeds to step SG2.

As a result, the distribution control unit 13 of the stream server 10 shown in FIG. 2 determines the answer in step SE1 as YES, and proceeds to step SE2. In step SE2, the distribution control unit 13 starts distributing the stream information JS for "contents A" (lecture meeting). Specifically, from the video camera 50 and the microphone 60, once "contents A", i.e. the animation data $D_1$ and the audio data $D_2$ on the lecture meeting are captured by the encoder 12, the encoder 12 encodes and compresses the animation data $D_1$ and the audio data $D_2$ based on the parameters such as the stream band and thus generates the stream information JS.

The distribution control unit 13 transmits the stream information JS with a time stamp attached thereto input thereto from the timer 15 to the multicast address "239.0.10.100" (see FIG. 4A) through the network control unit 14 and the network N, and then proceeds to step SE3. In step SE3, the distribution control unit 13 determines whether an instruction is given to end the distribution of the stream information JS or not, and until such an instruction is given, keeps the determination as NO.

In step SG2, on the other hand, the sync control unit 34 of the sync control server 30 shown in FIG. 3 activates the storage-type information distribution control program stored in the storage unit 31, and proceeds to step SG3. In step SG3, the sync control unit 34 determines whether an instruction to display the next page of the teaching material (hereinafter called the next page display instruction) is given from the distributor (lecturer) or not. This next page display instruction is for displaying the storage-type information JT (still image data) for the next page on the display units $41_1$ to $41_m$ in a lecture meeting conducted turning page by page of the teaching material.

When the distributor (lecturer) gives an instruction to display the next page using the input device 33, the sync control unit 34 turns YES the determination in step SG3, and proceeds to step SG4. In this case, the next page is the first page of the teaching material. Further, the sync control unit 34 recognizes the time point when the next page display instruction is given as the sync time based on the count on the timer 36.

In step SG4, the sync control unit 34 recognizes the "multicast address" ("239.0.10.199") of the destination of distribution of the storage-type information JT from the sync server information $J_1$. Then, the sync control unit 34 instructs the storage-type information server 20 through the network N to transmit the storage-type information JT for the first page to the multicast address "239.0.10.199" and as to the sync time described above, and the proceeds to step SG5.

As a result, the storage-type information server 20 determines the answer in step SF1 as YES, and proceeds to step SF2. In step SF2, the storage-type information server 20 first reads the storage-type information JT for the first page from the storage unit 21. Then, the storage-type information server 20 transmits the storage-type information JT with the sync time information corresponding to the sync time designated by the sync control unit 34, to the multicast address "239.0.10.199" (see FIG. 4A) through the network N, and then proceeds to step SF3. In step SF3, the storage-type information server 20 determines whether the storage-type information JT for the first page has been completely distributed or not. In the case under consideration, the answer is NO and the same process of determination is repeated.

Upon complete distribution of the storage-type information JT for the first page, the storage-type information server 20 determines the answer in step SF3 as YES and proceeds to step SF4. In step SF4, the storage-type information server 20 determines whether an instruction is given by the sync control server 30 to end the process. Since the answer is NO, the process returns to step SF1. After that, in step SF1, the storage-type information server 20 determines whether an instruction is given to distribute the storage-type information JT for the next page.

The storage-type information JT with the sync time information attached thereto is distributed to the clients $40_1$ to $40_m$ corresponding to the multicast address "1239.0.10.199". In step SF3, the sync control server 30 determines whether the distribution of the storage-type information JT is complete or not, and until the distribution is completed, the determination is kept at NO.

In step SG5, on the other hand, the sync control unit 34 of the sync control server 30 shown in FIG. 3 reads the client information $J_2$ (see FIG. 4B) from the storage unit 31, and then gives a receive/reproduce instruction to the IP addresses "22.33.44.100" to "22.33.44.199" obtained from the client information $J_2$, i.e. the clients $40_1$ to $40_m$, after which the process proceeds to step SG6.

This receive/reproduce instruction is for receiving the stream information JS transmitted to the multicast address "239.0.10.100", reproducing the stream information JS in real time, receiving the storage-type information JT for the first page transmitted to the multicast address "239.0.10.199", and synchronously reproducing the storage-type information JT and the stream information JS for the first page at the sync time.

Upon receipt of the receive/reproduce instruction, the receiving control unit $44_1$ of the client $40_1$ shown in FIG. 5 determines the answer in step SH1 as YES, and proceeds to step SH2. In step SH2, the receiving control unit $44_1$ starts receiving the stream information JS transmitted to the multicast address "239.0.10.100". In similar fashion, the receiving control unit $44_1$ starts receiving the storage-type information JT for the first page transmitted to the multicast address "239.0.10.199", and stores (accumulates) the received storage-type information JT in the storage unit $43_1$ through the interface unit $47_1$.

The receiving control unit $44_1$, after performing the process for synchronously reproducing the stream information JS and the storage-type information JT, proceeds to step SH3. Specifically, the receiving control unit $44_1$ generates the animation data and the audio data by restoring the stream information JS, and then supplies the resulting animation data and the audio data to the display unit $41_1$ through the interface unit $47_1$. As a result, in the display unit $41_1$, the animation and the audio data for "contents A" are reproduced in real time.

Further, during the real time reproduction of the stream information JS, the receiving control unit $44_1$ monitors whether the time stamp obtained from the stream information JS coincides with the sync time obtained from the sync time information attached to the storage-type information JT. Once the time stamp comes to coincide with the sync time, the receiving control unit $44_1$ outputs the storage-type information JT for the first page stored (accumulated) in the storage unit $43_1$ to the display unit $41_1$. As a result, in the display unit $41_1$, the storage-type information JT is synchronized with the stream information JS and then the storage-type information JT for the first page of the teaching material is synchronously reproduced.

In step SH3, the receiving control unit $44_1$ determines whether the reproduction of the storage-type information JT for the first page has been complete or not, and in the case where this determination is NO, the same process for determination is repeated. Upon complete reproduction of the storage-type information JT for the first page, the receiving control unit $44_1$ turns YES the determination in step SH3, and proceeds to step SH4. In step SH4, the receiving control unit $44_1$ determines whether an instruction is given by the sync control server 30 to end the process. In the case under consideration, the answer is NO, and the process is returned to step SH1. After that, in step SH1, the receiving control nit $44_1$ determines whether the receive/reproduce instruction for the storage-type information JT for the next page has been given or not. In the case under consideration, the answer is NO and the process for the same determination is repeated. Until the determination is made, the stream information JS continues to be reproduced in real time.

In step SG6, the sync control server 30 determines whether an instruction is given by the distributor (lecturer) to end the process. In the case under consideration, the determination is NO, and the process returns to SG3. In step SG3, the sync control unit 34 determines whether an instruction is given by the distributor (lecturer) to display the next page. In the case where an instruction is given by the distributor (lecturer) to display the next page using the input device 33, the sync control unit 34 determines the answer in step SG3 as YES and proceeds to step SG4. In the case under consideration, the next page is the second page of the teaching material. Further, the sync control unit 34 recognizes, as the sync time, the time when the instruction is given to display the next page based on the count on the timer 36.

In step SG4, the sync control unit 34 recognizes the "multicast address" ("239.0.10.199") of the destination of distribution of the storage-type information JT from the server information $J_1$ (see FIG. 4A). Then, the sync control unit 34 instructs the storage-type information server 20 through the network N to transmit the storage-type information JT for the second page to the multicast address "239.0.10.199" and as to the sync time described above, after which the process proceeds to step SG5.

As a result, the storage-type information server 20 determines the answer in step SF1 as YES and proceeds to step SF2. In step SF2, the storage-type information server 20 first reads the storage-type information JT for the second page from the storage unit 21. Then, the storage-type information server 20 transmits the storage-type information JT with the sync time information designated by the sync control unit 34 attached thereto, to the multicast address "239.0.10.199" (see FIG. 4A) through the network N. As a result, the storage-type information JT with the sync time information attached thereto is distributed to the clients $40_1$ to $40_m$ corresponding to the multicast address "239.0.10.199", respectively.

In step SG5, on the other hand, the sync control unit 34 of the sync control server 30 shown in FIG. 3 reads the client information $J_2$ (see FIG. 4B) from the storage unit 31, and then gives a receive/reproduce instruction to the IP addresses "22.33.44.100" to "22.33.44.199" obtained from the client information $J_2$, i.e. to the clients $40_1$ to $40_m$, after which the process proceeds to step SG6.

The receive/reproduce instruction involved is to receive the stream information JS transmitted to the multicast address "239.0.10.100", to reproduce the stream information JS in real time, to receive the storage-type information JT for the second page transmitted to the multicast address "239.0.10.199", and to synchronously reproduce the storage-type information JT and the stream information JS for the second page at the sync time.

Upon receipt of the receive/reproduce instruction, the receiving control unit $44_1$ of the client $40_1$ shown in FIG. 5 determines the answer in step SH1 as YES and proceeds to step SH2. In step SH2, the storage-type information JT for the second page transmitted to the multicast address "239.0.10.199" begins to be received, and the storage-type information JT thus received are stored (accumulated) in the storage unit $43_1$ through the interface unit $47_1$.

During the real time reproduction of the stream information JS, the receiving control unit $44_1$ monitors whether the time stamp obtained from the stream information JS has come to coincide with the sync time obtained from the sync time information attached to the storage-type information JT for the second page. When the time stamp comes to coincide with the sync time, the receiving control unit $44_1$ outputs the storage-type information JT for the second page stored (accumulated) in the storage unit $43_1$ to the display unit $41_1$. As a result, in the display unit $41_1$, the storage-type information JT for the second page of the teaching material is synchronously reproduced in temporal synchronism with the stream information JS. After that, each time the distributor (lecturer) gives an instruction to display the next page, the storage-type information JT for the third and subsequent pages is reproduced in synchronism with the stream information JS by way of the operation described above in the client $40_1$.

When the lecture meeting is finished, the distributor (lecturer) gives an instruction to the process using the input device 33 of FIG. 3. As a result, the sync control unit 34 determines the answer in step SG6 as YES and proceeds to step SG7. In step SG7, the sync control unit 34 gives an instruction to end the process to the stream server 10, the storage-type information server 20 and the clients $40_1$ to $40_m$ through the network N. Upon receipt of the instruction to end the process, the stream server 10 determines the answer in step SE3 as YES, and ends the process of distributing the stream information JS. The storage-type information server 20 also determines the answer in step SF4 as YES, and ends the process of distributing the storage-type information JT. In similar fashion, the clients $40_1$ to $40_m$ determine the answer in step SH4 as YES, respectively, and ends the receive/reproduce process.

As described above, according to the first embodiment, the stream information JS and the storage-type information JT are both synchronously reproduced in the clients $40_1$ to $40_m$ under the control of the sync control server 30. Therefore, as compared with the prior art case in which only the stream information JS is reproduced in real time, an information distribution service with a high added value can be provided.

Further, according to the first embodiment, as explained with reference to the second example of operation, the still image data for the teaching material of the lecture meeting is distributed as the storage-type information JT. Therefore, the still image with thin characters and thin lines can be reproduced in the clients $40_1$ to $40_m$.

The first embodiment described above refers to the case in which the storage-type information JT shown in FIG. 1 is stored beforehand in the storage unit 21, and distributed from the storage-type information server 20 to the clients 40, to 40. As an alternative, the storage-type information JT is stored in advance in the storage unit 11 of the stream server 10, and distributed to the clients $40_1$ to $40_m$ from the stream server 10. The latter case will be described in detail below as a second embodiment.

According to the second embodiment, the storage-type information server 20 and the storage unit 21 shown in FIG. 1 are lacking. Further, the storage unit 11 has stored therein the storage-type information JT. The stream server 10, in addition to the function of distributing the stream information JS described with reference to the first embodiment, has the function as the storage-type information server 20. Further, according to the second embodiment, the "server name" of the server information $J_1$ shown in FIG. 4A is indicated as "stream server" in place of "storage-type information sever" shown in the same drawing. Further, according to the second embodiment, the "server name" for the storage-type information JT shown in FIG. 4C is given as "stream server" in place of "storage-type information server" shown in the same drawing.

Figure 8:
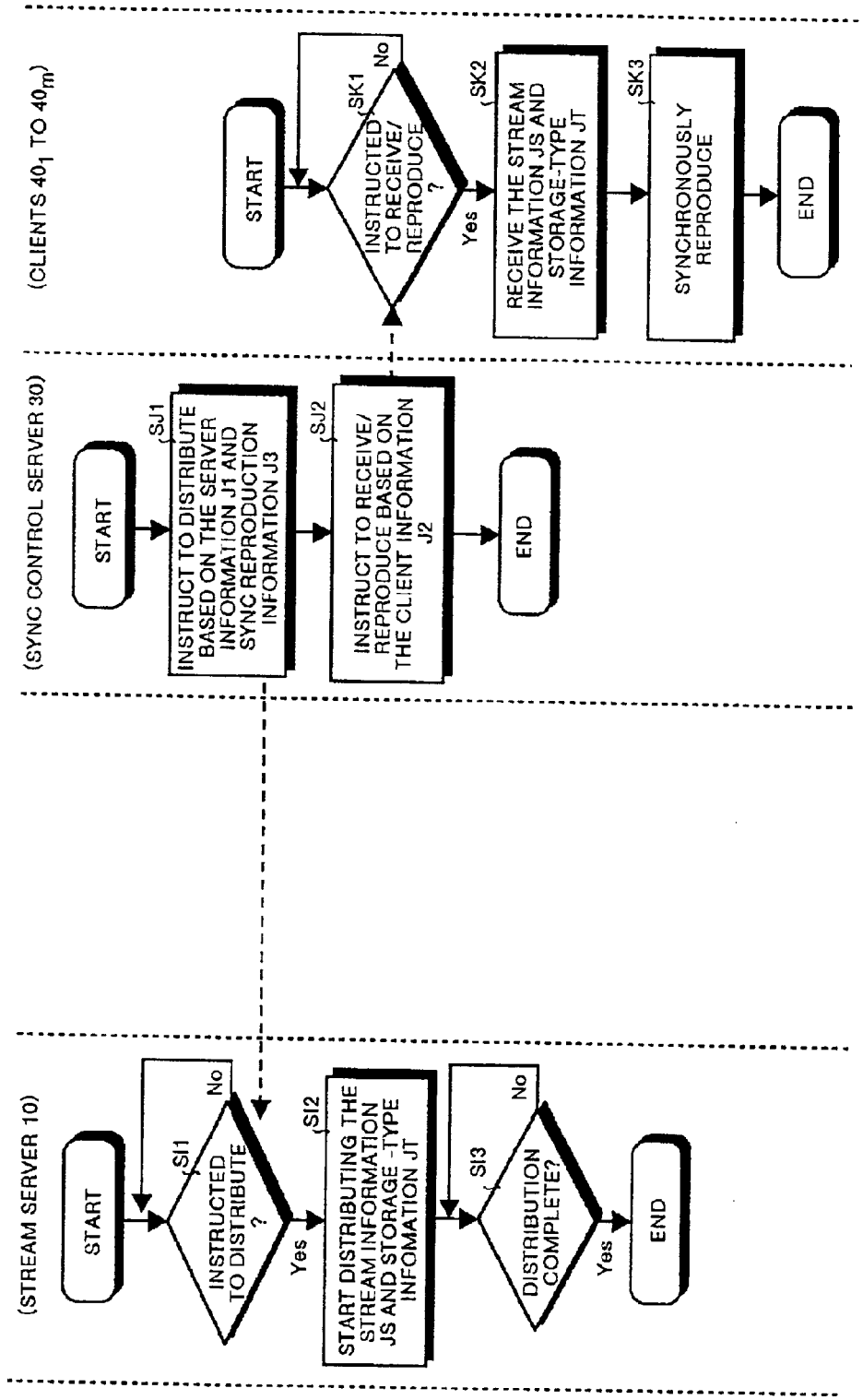
FIG. 8 is a flowchart for explaining the operation according to a second embodiment of the present invention.

Now, the operation of the second embodiment will be explained with reference to the flowchart of FIG. 8. In FIG. 1, the stream server 10 and the clients $40_1$ to $40_m$, once activated, proceed to step SI1 and step SK1, respectively, in FIG. 8. In step SI1, the distribution control unit 13 of the stream server 10 shown in FIG. 2 determines whether an instruction is given by the sync control server 30 to distribute the stream information JS and the storage-type information JT. In the case under consideration, the determination is NO and the process of determination is repeated.

In step SK1, on the other hand, the clients $40_1$ to $40_m$ determine whether a receive/reproduce instruction has been given from the sync control server 30. In this case, the determination is NO and the process for the same determination is repeated. The operation of the clients $40_2$ (not shown) to $40_m$ is similar to that of the client $40_1$, and therefore in the description that follows, reference is had primarily to the operation of the client $40_1$ shown in FIG. 5.

In step SK1, the receiving control unit $44_1$ of the client $40_1$ shown in FIG. 5, like in step SD1 (see FIG. 6), determines whether a receive/reproduce instruction has been given from the sync control server 30 or not. When the information instructing to start distribution is input by use of the input device 33 shown in FIG. 3 from the distributor, the sync control unit 34 of the sync control server 30 proceeds to step SJ1. In step SJ1, the sync control unit 34, like in step SC1 (see FIG. 6), reads the server information $J_1$ and the sync reproduction information $J_3$ shown in FIG. 4A and FIG. 4C, respectively, from the storage unit 31. Then, the sync control unit 34 recognizes the information ("server name", "contents name", "sync time") for the stream information JS and the storage-type information JT to be synchronously reproduced, from the sync reproduction information $J_3$.

Further, the sync control unit 34 recognizes the "multicast address" ("239.0.10.100") of the destination of distribution of the stream information JS and the "multicast address" ("239.0.10.199") of the destination of distribution of the storage-type information JT, respectively, from the server information $J_1$. Then, the sync control unit 34 instructs the stream server 10 through the network N to distribute the stream information JS for "contents A" to the multicast address "239.0.10.100", to transmit the storage-type information JT for "contents B" to the multicast address "239.0.10.199" and to set the sync time at "05'20", after which the process proceeds to step SJ2.

As a result, the distribution control unit 13 of the stream server 10 shown in FIG. 2 determines the answer in step SI1 as YES, and proceeds to step SI2. In step SI2, the distribution control unit 13 starts distributing the stream information JS and the storage-type information JT for "contents A" and "contents B".

Specifically, the stream server 10, like in the first embodiment, generates the stream information JS based on the animation data $D_1$ and the audio data $D_2$ from the video camera 50 and the microphone 60. In the distribution control unit 13, the stream information JS with the time stamp attached thereto based on the time count on the timer 15 is transmitted to the multicast address "239.0.10.100" (see FIG. 4A) through the network control unit 14 and the network N. As a result, the stream information JS with a time stamp attached thereto is distributed to the clients $40_1$ to $40_m$ corresponding to the multicast address "239.0.10.100".

Further, concurrently with the distribution of the stream information JS, the distribution control unit 13 reads the storage-type information JT from the storage unit 11. Then, the storage-type information JT with the sync time information attached thereto corresponding to the sync time ("05'20", see FIG. 4C) designated by the sync control unit 34 is transmitted to the multicast address "239.0.10.199" (see FIG. 4A) through the network N, and then the process proceeds to step S13.

As a result, the storage-type information JT with the sync time information attached thereto is distributed to the clients $40_1$ to $40_m$, respectively, corresponding to the multicast address "239.0.10.199". The sync time information ("05'20") attached to the storage-type information JT is a constant value. Instep SI3, the distribution control unit 13 determines whether the distribution of the stream information JS and the storage-type information JT has been complete or not, and until the distribution is complete, keeps the determination as NO.

In step SJ2, on the other hand, the sync control unit 34 of the sync control server 30 shown in FIG. 3, like in step SC2 (see FIG. 6), reads the client information $J_2$ (see FIG. 4B) from the storage unit 31, and then based on the client information $J_2$, gives a receive/reproduce instruction to the clients $40_1$ to $40_m$. This receive/reproduce instruction is to receive the stream information JS transmitted to the multicast address "239.0.10.100", to reproduce the stream information JS in real time, to receive the storage-type information JT transmitted to the multicast address "239.0.10.199", and to synchronously reproduce the storage-type information JT and the stream information JS at the same sync time point ("05'20").

Upon receipt of the receive/reproduce instruction, the receiving control unit $44_1$ of the client $40_1$ shown in FIG. 5 determines the answer in step SK1 as YES, and proceeds to step SK2. In step SK2, the receiving control unit $44_1$ starts receiving the stream information JS transmitted to the multicast address "239.0.10.100". In similar fashion, the receiving control unit $44_1$ starts receiving the storage-type information JT transmitted to the multicast address "239.0.10.199", and stores (accumulates) the received storage-type information JT in the storage unit $43_1$ through the interface unit $47_1$. In step SK3, the receiving control unit $44_1$, like in step SD3 (see FIG. 6), performs the process for synchronously reproducing the stream information JS and the storage-type information JT.

As described above, according to the second embodiment, a similar effect to that of the first embodiment is obtained, and since the stream information JS and the storage-type information JT are distributed from the same stream server 10, the effect of transmission delay in the network N can be reduced.

The third embodiment is explained below. In the first embodiment described above, the storage-type information JT shown in FIG. 1 is stored beforehand in the storage unit 21, and distributed from the storage-type information server 20 to the clients $40_1$ to $40_m$. As an alternative, the storage-type information JT can be stored in the storage units $43_1$ to $43_m$ of the clients $40_1$ to $40_m$, respectively. The latter case will be explained in detail as a third embodiment below.

In the third embodiment, the storage-type information server 20 and the storage unit 21 shown in FIG. 1 are not included. The storage units $43_1$ to $43_m$ have stored therein the storage-type information JT with the sync information added thereto. Further, in the third embodiment, the storage unit 31 of FIG. 1 has stored therein the sync reproduction information $J_4$ of FIG. 10 in place of the sync reproduction information $J_3$ of FIG. 4C. In FIG. 10, the component parts corresponding to those in FIG. 4C are designated by the same reference numerals, respectively. In the sync reproduction information $J_4$ shown in FIG. 10, the "server name" shown in FIG. 4C for the storage-type information JT is replaced by "client name". The "client name" is defined as "clients 1 to m".

Figure 9:
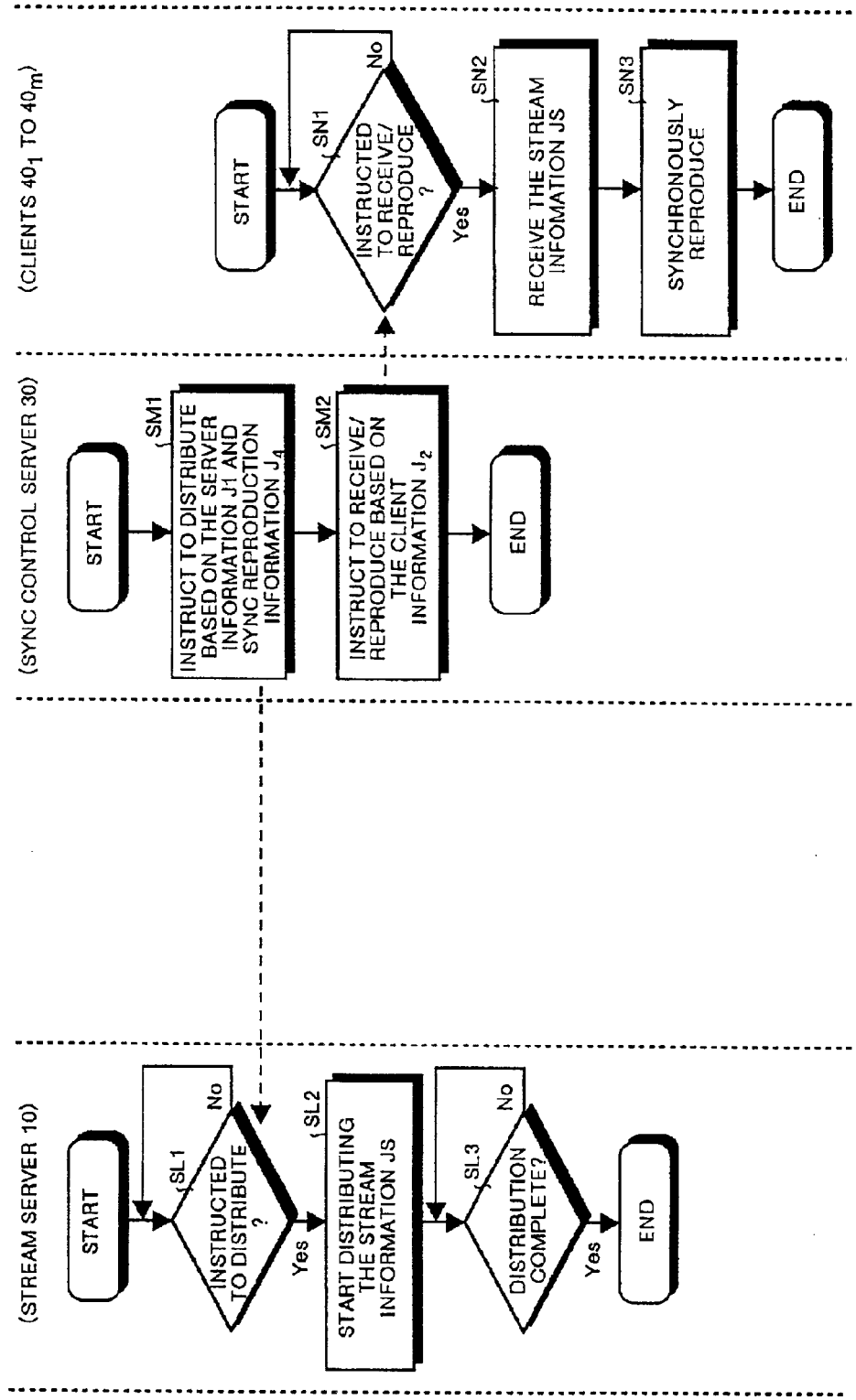
FIG. 9 is a flowchart for explaining the operation according to a third embodiment of the present invention.

Now, the operation of the third embodiment will be explained with reference to the flowchart of FIG. 9. In FIG. 1, the stream server 10 and the clients $40_1$ to $40_m$, once activated, proceed to steps SL1 and SN1, respectively, shown in FIG. 9. In step SL1, the distribution control unit 13 of the stream server 10 shown in FIG. 2 determines whether an instruction is given by the sync control server 30 to distribute the stream information JS. In the case under consideration, the determination is NO, and the process for the same determination is repeated.

In step SN1, on the other hand, the clients $40_1$ to $40_m$ determine whether a receive/reproduce instruction has been given from the sync control server 30 or not. In this case, the answer is NO, and the same process for determination is repeated. In the description that follows, reference is primarily had to the operation of the client $40_1$ shown in FIG. 5, since the operation of the clients $40_2$ (not shown) to $40_m$ is similar to that of the client $40_1$.

In step SN1, the receiving control unit $44_1$ of the client $40_1$ shown in FIG. 5, like in step SD1 (see FIG. 6), determines whether a receive/reproduce instruction has been given from the sync control server 30 or not. When the information instructing to start the distribution is input by way of the input device 33 shown in FIG. 3 from the distributor, the sync control unit 34 of the sync control server 30 proceeds to step SM1. In step SM1, the sync control unit 34 reads the server information $J_1$ shown in FIG. 4A and the sync reproduction information $J_4$ shown in FIG. 10 from the storage unit 31. Then, the sync control unit 34 recognizes the information ("server name", "client name", "contents name", "sync time") for the stream information JS and the storage-type information JT to be synchronously reproduced, from the sync reproduction information $J_4$.

Further, the sync control unit 34 recognizes the "multicast address" ("239.0.10.100") of the destination of distribution of the stream information JS from the server information $J_1$. Then, the sync control unit 34 instructs the stream server 10 through the network N to distribute the stream information JS for "contents A" to the multicast address "239.0.10.100", after which the process proceeds to step SM2.

As a result, the distribution control unit 13 of the stream server 10 shown in FIG. 2 determines the answer in step SL1 as YES, and proceeds to step SL2. In step SL2, the distribution control unit 13 starts distributing the stream information JS for "contents A". Specifically, the distribution control unit 13 transmits the stream information JS with a time stamp attached thereto based on the count on the timer 15 to the multicast address "239.0.10.100" (see FIG. 4A) through the network control unit 14 and the network N. As a result, the stream information JS with a time stamp attached thereto is distributed to the clients $40_1$ to $40_m$ corresponding to the multicast address "239.0.10.100", respectively.

In step SM2, on the other hand, the sync control unit 34 of the sync control server 30 shown in FIG. 3, like in step SC2 (see FIG. 6), reads the client information $J_2$ (see FIG. 4B) from the storage unit 31, and based on this client information $J_2$, gives a receive/reproduce instruction to the clients $40_1$ to $40_m$, respectively. The receive/reproduce instruction is to receive the stream information JS transmitted to the multicast address "239.0.10.100", to reproduce the stream information JS in real time, to read the storage-type information JT from the storage units $43_1$ to $43_m$, respectively, and to synchronously reproduce the storage-type information JT and the stream information JS at the sync time ("05'20") (see FIG. 10).

Upon receipt of the receive/reproduce instruction, the receiving control unit $44_1$ of the client $40_1$ shown in FIG. 5 determines the answer in step SN1 as YES and proceeds to step SN2. In step SN2, the receiving control unit $44_1$ starts receiving the stream information JS transmitted to the multicast address "239.0.10.100", and then proceeds to step SN3. In step SN3, the receiving control unit $44_1$ reads the storage-type information JT from the storage unit $43_1$, and then, like in step SD3 (see FIG. 6), performs the process of synchronously reproducing the stream information JS and the storage-type information JT.

Specifically, the receiving control unit $44_1$ reproduces the stream information JS in real time, and monitors whether the relative time based on the real time reproduction start time has come to coincide with the sync time ("05'20") added to the storage-type information JT. Once the relative time comes to coincide with the sync time ("05'20"), the receiving control unit $44_1$ outputs the storage-type information JT to the display unit $41_1$. As a result, in the display unit $41_1$, the storage-type information JT for "contents B" is reproduced in temporal synchronism with the stream information JS.

As described above, according to the third embodiment, a similar effect to that of the first embodiment is obtained, and since the storage-type information JT is stored beforehand in the storage units $43_1$ to $43_m$ of the clients $40_1$ to $40_m$, the storage-type information JT is not required to be transmitted on the network N and therefore operation is not affected by a transmission delay.

In the first embodiment described above, the storage-type information JT shown in FIG. 1 is stored beforehand in the storage unit 21, and distributed to the clients $40_1$ to $40_m$ from the storage-type information server 20. Alternatively, the storage-type information JT is transmitted to the stream server 10 from the storage-type information server 20 before synchronous reproduction, and then the storage-type information JT is distributed from the stream server 10. In the description that follows, the latter case will be explained in detail as a fourth embodiment.

Figure 11:
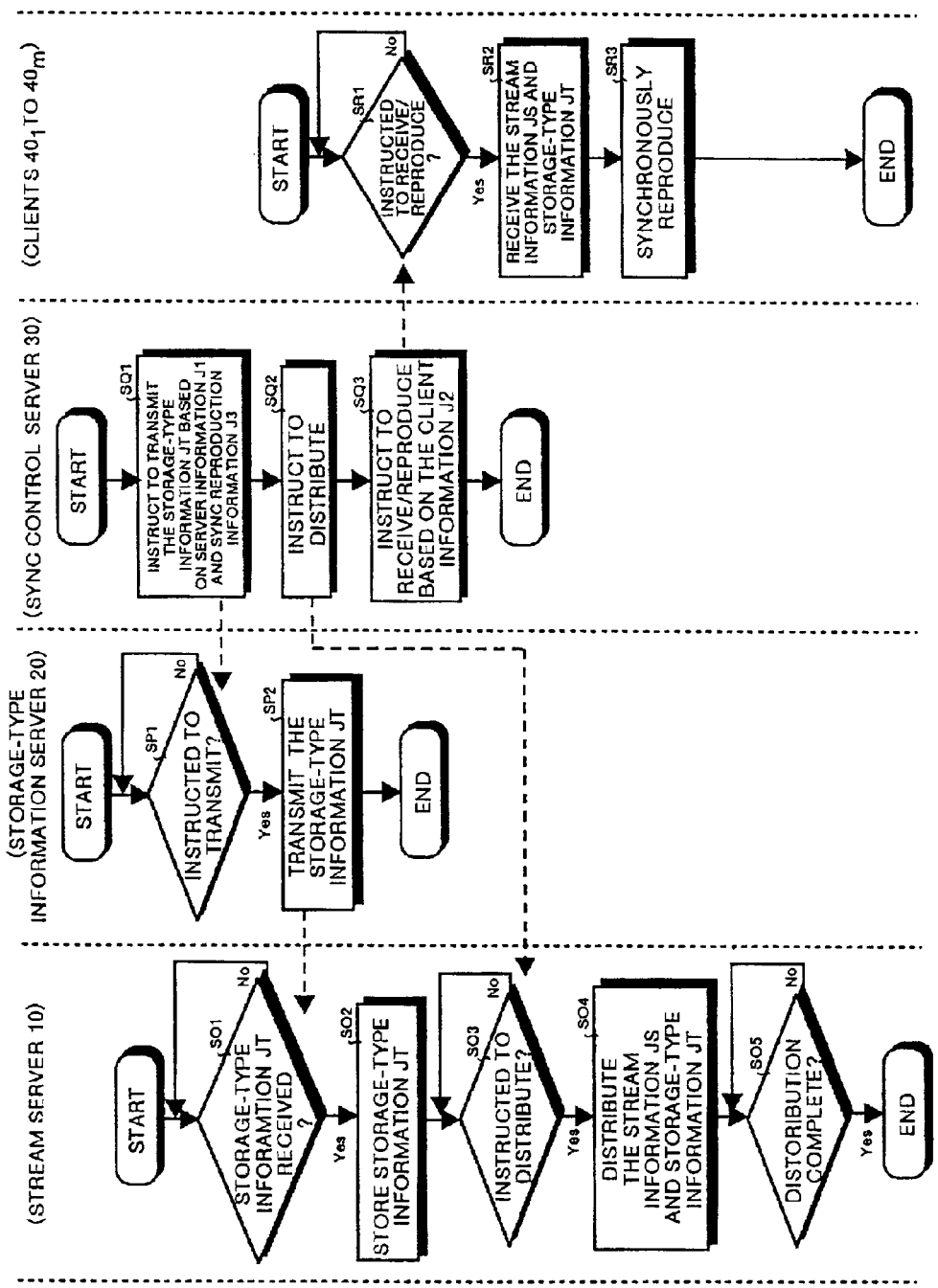
FIG. 11 is a flowchart for explaining the operation according to a fourth embodiment of the present invention.

The operation of the fourth embodiment will be explained below with reference to the flowchart of FIG. 11. In FIG. 1, the stream serer 10, the storage-type information server 20 and the clients $40_1$ to $40_m$, once activated, proceed to steps SO1, SP1 and SR1, respectively, shown in FIG. 11. In step SO1, the distribution control unit 13 of the stream server 10 shown in FIG. 2 determines whether the storage-type information JT transmitted from the storage-type information server 20 has been received or not. In the case under consideration, the determination is NO, and the same process for determination is repeated. In step SP1, the storage-type information server 20 determines whether an instruction is given by the sync control server 30 to transmit the storage-type information JT to the stream server 10 or not. In this case, the determination is NO, and the same process for determination is repeated.

In step SR1, on the other hand, the clients $40_1$ to $40_m$ determine whether a receive/reproduce instruction has been given from the sync control server 30. In the present case, the determination is NO, and the same process for determination is repeated. In the description that follows, reference is primarily made to the operation of the client $40_1$ shown in FIG. 5, since the operation of the clients $40_2$ (not shown) to $40_m$ is similar to that of the client $40_1$.

In this case, in step SR1, like in step SD1 (see FIG. 6), the receiving control unit $44_1$ of the client $40_1$ shown in FIG. 5 determines whether a receive/reproduce instruction has been received from the sync control server 30. When the distributor inputs the information instructing to start distribution by way of the input device 33 shown in FIG. 3, the sync control unit 34 of the sync control server 30 proceeds to step SQ1. In step SQ1, the sync control unit 34 reads the server information $J_1$ shown in FIG. 4A and the sync reproduction information $J_3$ shown in FIG. 4C from the storage unit 31. Then, the sync control unit 34 recognizes the "server IP address" ("11.2.3.199" in this case) of the storage-type information server (the storage-type information server 20 in this case) holding the storage-type information JT, from the server $J_1$ shown in FIG. 4A.

Then, the sync control unit 34 recognizes the information ("server name", "client name", "contents name", "sync time") for the stream information JS and the storage-type information JT to be synchronously reproduced, from the sync reproduction information J, shown in FIG. 4C. The sync control unit 34, based on the server IP address "11.2.3.199", instructs the storage-type information server 20 to transmit the storage-type information JT, and then proceeds to step SQ2.

As a result, the storage-type information server 20 determines the answer in step SP1 as YES and proceeds to step SP2. In step SP2, the storage-type information server 20 reads the storage-type information JT from the storage unit 21 and transmits it to the stream server 10. Upon receipt of the storage-type information JT, the distribution control unit 13 of the stream server 10 shown in FIG. 2 determines the answer in step SO1 as YES and proceeds to step SO2. In step SO2, the stream server 10 stores the received storage-type information JT in the storage unit 11, and then proceeds to step SO3. In step SO3, the distribution control unit 13 of the stream server 10 determines whether an instruction is given by the sync control server 30 to distribute the stream information JS and the storage-type information JT. In the case under consideration, the determination is NO, and the same process for determination is repeated.

In step SQ2, the sync control unit 34 of the sync control server 30 shown in FIG. 3, like in step SC1 (see FIG. 6), recognizes the "multicast address" ("239.0.10.100") of the destination of distribution of the stream information JS and the "multicast address" ("239.0.10.199") of the destination of distribution of the storage-type information JT, from the server information $J_1$. Then, the sync control unit 34 instructs the stream server 10 through the network N to distribute the stream information JS for "contents A" to the multicast address "239.0.10.100", to transmit the storage-type information JT for "contents B" to the multicast address "239.0.10.199", and to set the sync time at "05'20". Then, the process proceeds to step SQ3.

As a result, the distribution control unit 13 of the stream server 10 shown in FIG. 2 determines the answer in step SO3 as YES, and proceeds to step SO4. In step SO4, the distribution control unit 13 starts distributing the stream information JS and the storage-type information JT for "contents A" and "contents B".

Specifically, the distribution control unit 13 of the stream server 10, like in step SI2 (see FIG. 8), transmits the stream information JS with the time stamp attached thereto, generated based on the animation data $D_1$ and the audio data $D_2$, to the multicast address "239.0.10.100" (see FIG. 4A) through the network control unit 14 and the network N. As a result, the stream information JS with a time stamp attached thereto is distributed to the clients $40_1$ to $40_m$ corresponding to the multicast address "239.0.10.100".

Concurrently with the distribution of the stream information JS, the distribution control unit 13 reads the storage-type information JT from the storage unit 11. Then, the storage-type information JT with the sync time information corresponding to the sync time ("05'20", see FIG. 4C) attached thereto, designated by the sync control unit 34, is transmitted to the multicast address "239.0.10.199" (see FIG. 4A) through the network N, after which the process proceeds to step SO5.

As a result, the storage-type information JT with the sync time information attached thereto is distributed to the clients $40_1$ to $40_m$ corresponding to the multicast address "239.0.10.199", respectively. The sync time information ("05'20") attached to the storage-type information JT is a constant value. In step SO5, the distribution control unit 13 determines whether the distribution of the stream information JS and the storage-type information JT has been completed, and until the distribution is complete, keeps the determination as NO.

In step SQ3, on the other hand, the sync control unit 34 of the sync control server 30 shown in FIG. 3, like in step SJ2 (see FIG. 8), reads the client information $J_2$ (see FIG. 4B) from the storage unit 31, and then based on the client information $J_2$, gives a receive/reproduce instruction to the clients $40_1$ to $40_m$. In the case under consideration, the receive/reproduce instruction is to receive the stream information JS transmitted to the multicast address "1239.0.10.100", to reproduce the stream information JS in real time, to receive the storage-type information JT transmitted to the multicast address "239.0.10.199", and to synchronously reproduce the storage-type information JT and the stream information JS at the sync time ("05'20").

Upon receipt of the receive/reproduce instruction, the receiving control unit $44_1$ of the client $40_1$ shown in FIG. 5 determines the answer in step SR1 as YES, and proceeds to step SR2. In step SR2, the receiving control unit $44_1$ starts receiving the stream information JS transmitted to the multicast address "239.0.10.100". In similar fashion, the receiving control unit $44_1$ starts receiving the storage-type information JT transmitted to the multicast address "239.0.10.199" and stores (accumulates) the received storage-type information JT in the storage unit $43_1$ through the interface unit $47_1$. In step SR3, the receiving control unit $44_1$, like in step SK3 (see FIG. 8), performs the process for synchronously reproducing the stream information JS and the storage-type information JT.

As described above, according to the fourth embodiment, the effect similar to that of the first embodiment is obtained, while at the same time reducing the effect of a transmission delay in the network N in view of the fact that the stream information JS and the storage-type information JT are distributed from the same stream server 10.

In the first embodiment described above, the storage-type information JT shown in FIG. 1 is stored beforehand in the storage unit 21, and distributed to the clients $40_1$ to $40_m$ from the storage-type information server 20. As an alternative, the storage-type information JT may be distributed to the clients $40_1$ to $40_m$ from the storage-type information server 20 before the synchronous reproduction. The latter case will be described in detail below as a fifth embodiment.

Figure 12:
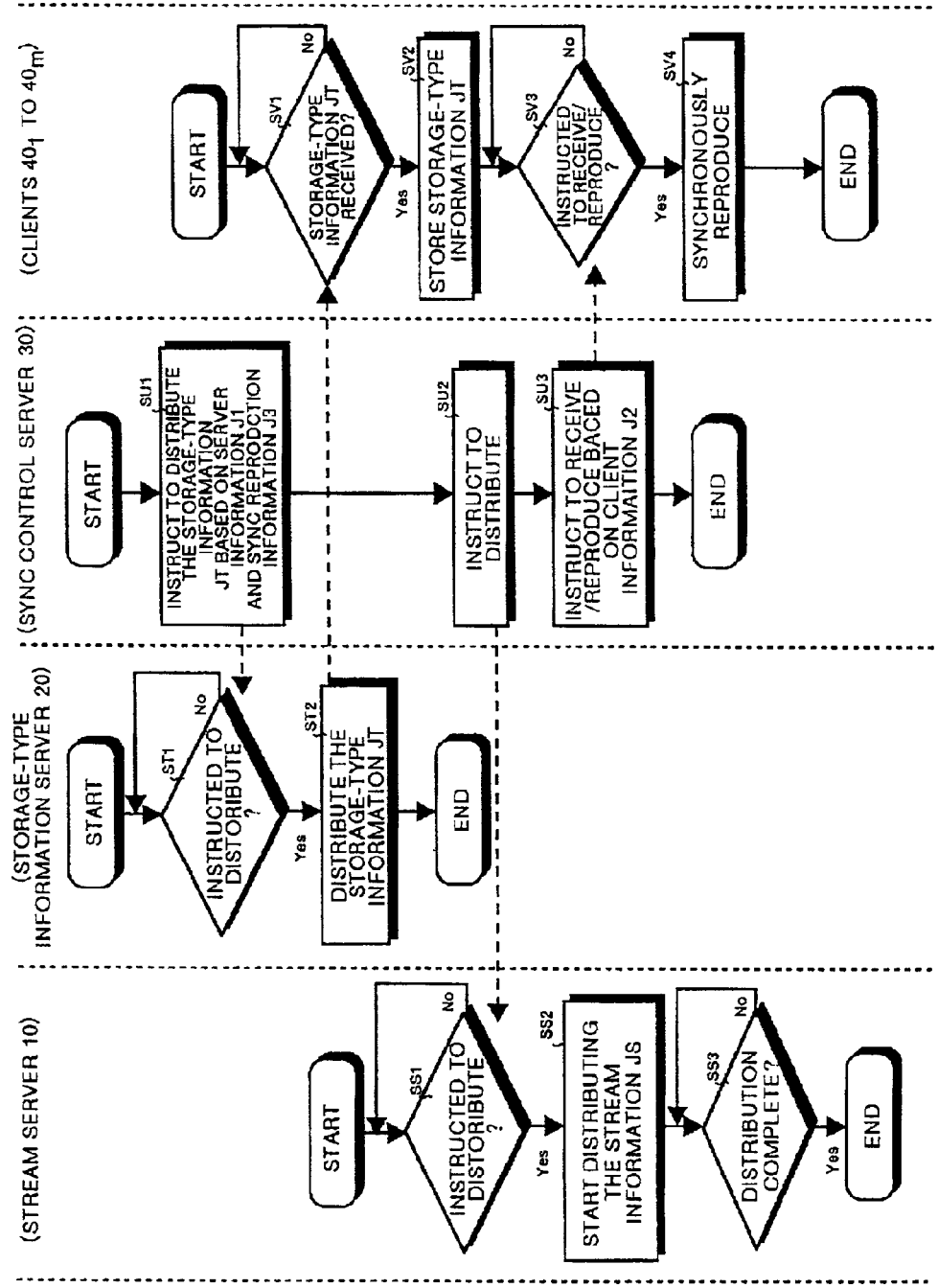
FIG. 12 is a flowchart for explaining the operation according to a fifth embodiment.

Now, the operation of the fifth embodiment will be explained with reference to the flowchart of FIG. 12. In FIG. 1, the stream server 10, the storage-type information server 20 and the clients $40_1$ to $40_m$, when activated, proceed to steps SS1, ST1 and SV1, respectively, shown in FIG. 12. In step SS1, the distribution control unit 13 of the stream server 10 of FIG. 2 determines whether an instruction is given by the sync control server 30 to distribute the stream information JS. In the case under consideration, the determination is NO, and the process for determination is repeated. In step ST1, the storage-type information server 20 determines whether an instruction is given from the sync control server 30 to distribute the storage-type information JT to the clients $40_1$ to $40_m$. In this case, the answer is NO, and the same process for determination is repeated.

In step SV1, on the other hand, the clients $40_1$ to $40_m$ determine whether the storage-type information JT has been received from the storage-type information server 20. In the case under consideration, the answer is NO, and the same process for determination is repeated. In the description that follows, main emphasis will be placed on the explanation of the operation of the client $40_1$ shown in FIG. 5 since the operation of the clients $40_2$ (not shown) to $40_m$ is similar to that of the client $40_1$. Thus, in step SV1, the receiving control unit $44_1$ of the client $40_1$ shown in FIG. 5 determines whether the storage-type information JT has been received or not. In the case under consideration, the determination is NO, and the process for determination is repeated.

Assume that the distributor has input the information instructing to start distribution by way of the input device 33 shown in FIG. 3. The sync control unit 34 of the sync control server 30 proceeds to step SU1. In step SU1, the sync control unit 34 reads the server information $J_1$ shown in FIG. 4A and the sync reproduction information $J_3$ shown in FIG. 4C from the storage unit 31. Then, the sync control unit 34 recognizes the "server IP address" ("11.2.3.199" in this case) of the storage-type information server (the storage-type server 20 in this case) holding the storage-type information JT, from the server information $J_1$ shown in FIG. 4A.

Then, the sync control unit 34 recognizes the information ("server name", "client name", "contents name", "sync time") for the stream information JS and the storage-type information JT to be reproduced, from the sync reproduction information $J_3$ shown in FIG. 4C. The sync control unit 34 thus instructs the storage-type information sever 20 to distribute the storage-type information JT based on the server IP address "11.2.3.199", and then proceeds to step SU2.

As a result, the storage-type information server 20 determines the answer in step ST1 as YES and proceeds to step ST2. In step ST2, the storage-type information server 20 reads the storage-type information JT from the storage unit 21, and distributes it to the multicast address "239.0.10.199", i.e. the clients $40_1$ to $40_m$.

Upon receipt of the storage-type information JT, the receiving control unit $44_1$ of the client $40_1$ shown in FIG. 5 determines the answer in step SV1 as YES, and proceeds to step SV2. In step SV2, the receiving control unit $44_1$ stores the received storage-type information JT in the storage unit $43_1$, and then proceeds to step SV3. In step SV3, the receiving control unit $44_1$ determines whether a receive/reproduce instruction is given from the sync control server 30. In the case under consideration, the determination is NO, and the same process for determination is repeated.

In step SU2, on the other hand, the sync control unit 34 of the sync control server 30 shown in FIG. 3 recognizes the "multicast address" ("239.0.10.100") of the destination of distribution of the stream information JS from the server information $J_1$. Then, the sync control unit 34 instructs, through the network N, the stream server 10 to distribute the stream information JS for "contents A" to the multicast address "239.0.10.100", and then proceeds to step SU3.

As a result, the distribution control unit 13 of the stream server 10 shown in FIG. 2 determines the answer in step SS1 as YES and proceeds to step SS2. In step SS2, the distribution control unit 13 starts distributing the stream information JS for "contents A".

Specifically, the distribution control unit 13 of the stream server 10 transmits the stream information JS with a time stamp attached thereto, which is generated based on the animation data $D_1$ and the audio data $D_2$, to the multicast address "239.0.10.100" (see FIG. 4A) through the network control unit 14 and the network N. As a result, the stream information JS with a time stamp is distributed to the clients $40_1$ to $40_m$ corresponding to the multicast address "239.0.10.100", respectively. In step SS3, on the other hand, the distribution control unit 13 determines whether the distribution of the stream information JS has been complete, and until the end of distribution, keeps the answer at NO.

In step SU3, the sync control unit 34 of the sync control server 30 shown in FIG. 3 reads the client information $J_2$ (see FIG. 4B) from the storage unit 31, and then gives a receive/reproduce instruction to the clients $40_1$ to $40_m$ based on the client information $J_2$. In this case, the receive/reproduce instruction is to receive the stream information JS transmitted to the multicast address "239.0.10.100", to reproduce the stream information JS in real time, and to synchronously reproduce the storage-type information JT and the stream information JS at the sync time ("05'20").

Upon receipt of the receive/reproduce instruction, the receiving control unit $44_1$ of the client $40_1$ shown in FIG. 5 determines the answer in step SV3 as YES, and proceeds to step SV4. In step SV4, the receiving control unit $44_1$ performs the process of synchronous reproduction. Specifically, the receiving control unit $44_1$ starts receiving the stream information JS transmitted to the multicast address "239.0.10.100" while at the same time reading the storage-type information JT from the storage unit $43_1$.

The receiving control unit $44_1$ reproduces the stream information JS in real time, and monitors whether the relative time based on the real time reproduction start time described above as a reference time has come to coincide with the sync time ("05'20") for the storage-type information JT. Once the relative time has come to coincide with the sync time ("05'20"), the receiving control unit $44_1$ outputs the storage-type information JT to the display unit $41_1$. As a result, in the display unit $41_1$, the storage-type information JT for "contents B" is synchronously reproduced in temporal synchronism with the stream information JS.

As described above, according to the fifth embodiment, an effect similar to that of the first embodiment is obtained. At the same time, in view of the fact that the storage-type information JT is distributed to the clients $40_1$ to $40_m$ from the storage-type information server 20 before synchronous reproduction, the effect of the transmission delay in the network N can be reduced.

In the first embodiment described above, the storage-type information JT shown in FIG. 1 is stored beforehand in the storage unit 21, and distributed to the clients $40_1$ to $40_m$ from the storage-type information server 20. Alternatively, the storage-type information JT is held in the stream server 10, and transmitted to the storage-type server 20 from the stream server 10 before synchronous reproduction, followed by being distributed from the storage-type information server 20. In the description that follows, a sixth embodiment referring to the latter case will be explained in detail.

According to the sixth embodiment, the storage unit 11 shown in FIG. 1 has stored therein the storage-type information JT. Further, the "server name" of the server information $J_1$ shown in FIG. 4A of the sixth embodiment is "stream server" instead of "storage-type information server" shown in the drawing. Further, the "server name" for the storage-type information JT shown in FIG. 4C in the second embodiment is changed from the "storage-type information server" shown in the drawing to "stream server".

Figure 13:
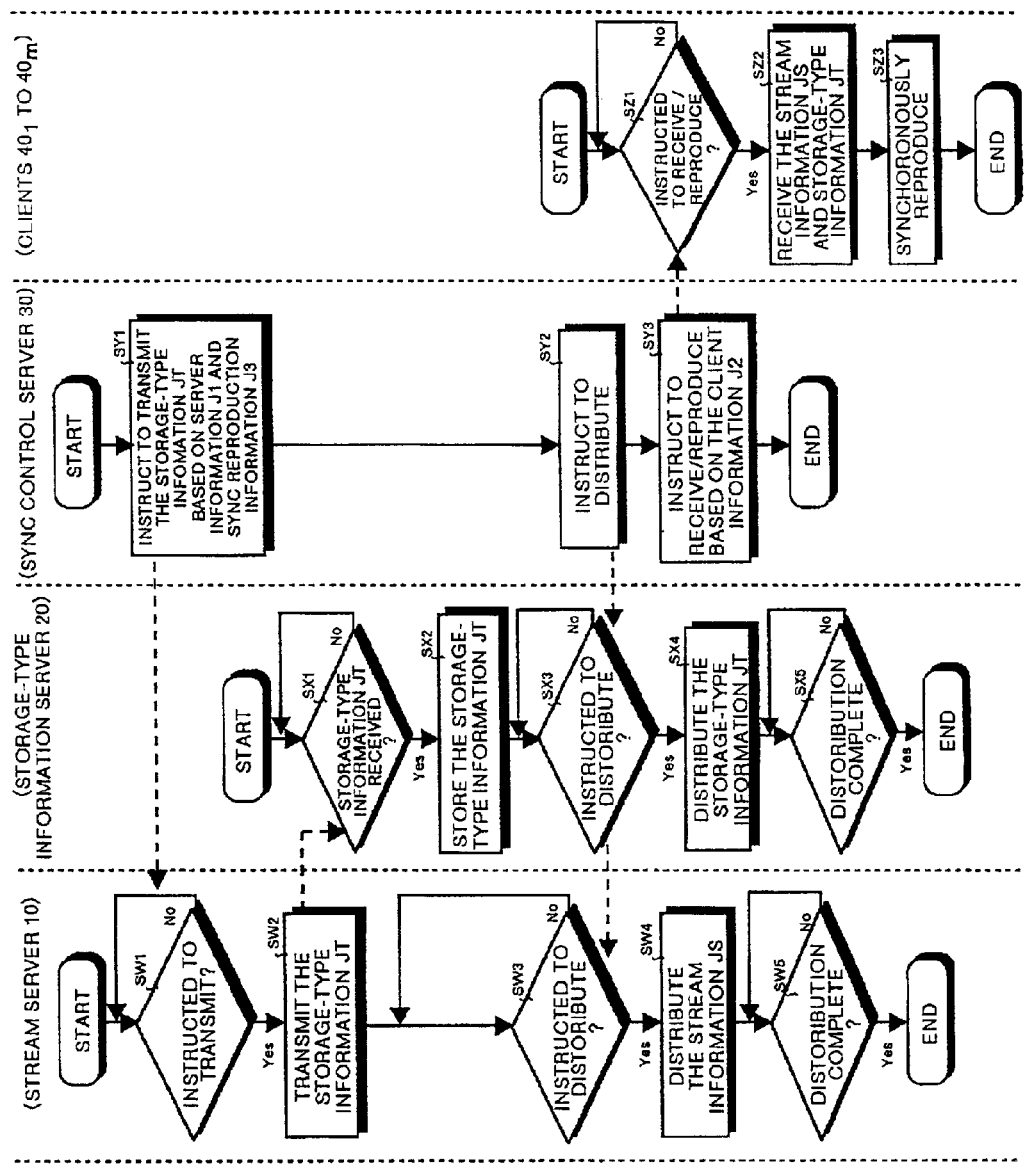
FIG. 13 is a flowchart for explaining the operation according to a sixth embodiment of the present invention.

Now, the operation of the sixth embodiment will be explained with reference to the flowchart of FIG. 13. In FIG. 1, the stream server 10, the storage-type information server 20 and the clients $40_1$ to $40_m$, once activated, proceed to steps SW1, SX1 and SZ1, respectively, shown in FIG. 13.

In step SW1, the distribution control unit 13 of the stream server 10 shown in FIG. 2 determines whether an instruction is given by the sync control server 30 to transmit the storage-type information JT to the storage-type information server 20 or not. In the case under consideration, the answer is NO, and the same process for determination is repeated. In step SX1, on the other hand, the storage-type information server 20 determines whether the storage-type information JT has been received from the stream server 10 or not. In this case, the answer is NO, and the same process for determination is repeated.

In step SZ1, the clients $40_1$ to $40_m$ determine whether a receive/reproduce instruction has been given by the sync control server 30. In the case under consideration, the determination is NO, and the same process for determination is repeated. In the description that follows, main emphasis will be placed on the operation of the client $40_1$ shown in FIG. 5 since the operation of the clients $40_2$ (not shown) to $40_m$ is similar to that of the client $40_1$.

In this case, in step SZ1, the receiving control unit 44 of the client $40_1$ shown in FIG. 5 determines whether a receive/reproduce instruction has been received from the sync control server 30 or not. When the distributor inputs the information for instructing to start distribution using the input device 33 shown in FIG. 3, the sync control unit 34 of the sync control server 30 proceeds to step SY1. In step SY1, the sync control unit 34 reads the server information $J_1$ shown in FIG. 4A and the sync reproduction information $J_3$ shown in FIG. 4C from the storage unit 31. Then, the sync control unit 34 recognizes the "server IP address" ("11.2.3.100" in this case) of the stream server (the stream server 10 in this case) holding the storage-type information JT, from the service information $J_1$ shown in FIG. 4A.

Then, the sync control unit 34 recognizes the information ("server name", "client name", "contents name", "sync time") for the stream information JS and the storage-type information JT to be synchronously reproduced, from the sync reproduction information $J_3$ shown in FIG. 4C. The sync control unit 34, after issuing an instruction to the stream server 10 to transmit the storage-type information JT, based on the server IP address "11.2.3.100", proceeds to step SY2.

As a result, the distribution control unit 13 of the stream server 10 shown in FIG. 2 determines the answer in step SW1 as YES and proceeds to step SW2. In step SW2, the distribution control unit 13 reads the storage-type information JT from the storage unit 11, and transmits it to the storage-type information server 20, after which the process proceeds to step SW3. In step SW3, the distribution control unit 13 determines whether an instruction is given by the sync control server 30 to distribute the stream information JS or not. In the case under consideration, the determination is NO, and the same process for determination is repeated.

Upon receipt of the storage-type information JT, the storage-type information server 20 determines the answer in step SX1 as YES, and proceeds to step SX2. In step SX2, the storage-type information server 20 stores the received storage-type information JT in the storage unit 21, and then proceeds to step SX3. In step SX3, the storage-type information server 20 determines whether an instruction is given by the sync control server 30 to distribute the storage-type information JT. In the case under consideration, the determination is NO, and the same process for determination is repeated.

In step SY2, the sync control unit 34 of the sync control server 30 shown in FIG. 3 recognizes the information ("server name", "contents name", "sync time") for the stream information JS and the storage-type information JT to be synchronously reproduced, from the sync reproduction information $J_3$ shown in FIG. 4C. Then, the sync control unit 34 recognizes the "stream server" (the stream server 10) and the "storage-type information server" (the storage-type information server 20) for distributing the stream information JS and the storage-type information JT, from the server information $J_1$ shown in FIG. 4A.

Further, the sync control unit 34 recognizes the "multicast address" ("239.0.10.100") of the destination of distribution of the stream information JS and the "multicast address" ("239.0.10.199") of the destination of distribution of the storage-type information JT, respectively, from the server information $J_1$. Then, the sync control unit 34 instructs the stream server 10, through the network N, to distribute the stream information JS for "contents A" to the multicast address "239.0.10.100". Concurrently with this instruction, the sync control unit 34 instructs the storage-type information server 20, through the network N, to transmit the storage-type information JT for "contents B" to the multicast address "239.0.10.199" and to set the sync time at "05'20", after which the process proceeds to step SY3.

As a result, the distribution control unit 13 of the stream server 10 shown in FIG. 2 determines the answer in step SW3 as YES, and proceeds to step SW4. In step SW4, the distribution control unit 13 distributes the stream information JS for "contents A". Specifically, the distribution control unit 13 transmits the stream information JS with a time stamp attached thereto, which is generated based on the animation data $D_1$ and the audio data $D_2$, to the multicast address "239.0.10.100 (see FIG. 4A) through the network control unit 14 and the network N, after which the process proceeds to step SW5.

The stream information JS with a time stamp added thereto is distributed to the clients $40_1$ to $40_m$ corresponding to the multicast address "239.0.10.100". In step SW5, the distribution control unit 13 determines whether the distribution of the stream information JS and the storage-type information JT has been complete or not, and until the distribution is complete, keeps the determination at NO.

Upon receipt of an instruction for distribution from the sync control unit 34 of the sync control server 30, the storage-type server 20 determines the answer in step SX3 as YES, and proceeds to step SX4. In step SX4, the storage-type information server 20 first reads the storage-type information JT from the storage unit 21. Then, the storage-type information server 20 transmits the storage-type information JT with the sync time information thereto corresponding to the sync time ("05'20", see FIG. 4C) designated by the sync control unit 34, to the multicast address "239.0.10.199" (see FIG. 4A) through the network N, and then proceeds to step SX5.

As a result, the storage-type information JT with the sync time information added thereto is distributed to the clients $40_1$ to $40_m$ corresponding to the multicast address "239.0.10.199". In step SX5, the storage-type information server 20 determines whether the distribution of the storage-type information JT is complete or not, and until the distribution is complete, keeps the determination at NO.

In step SY3, on the other hand, the sync control unit 34 of the sync control server 30 shown in FIG. 3 reads the client information $J_2$ (see FIG. 4B) from the storage unit 31, and then based on the client information $J_2$, gives a receive/reproduce instruction to the clients $40_1$ to $40_m$. This receive/reproduce instruction is to receive the stream information JS transmitted to the multicast address "239.0.10.100", to reproduce the stream information JS in real time, to receive the storage-type information JT transmitted to the multicast address "239.0.10.199" and to synchronously reproduce the storage-type information JT and the stream information JS at the sync time ("05'20").

Upon receipt of a receive/reproduce instruction, the receiving control unit $44_1$ of the client $40_1$ shown in FIG. 5 determines the answer in step SZ1 as YES, and proceeds to step SZ2. In step SZ2, the receiving control unit $44_1$ starts receiving the stream information JS transmitted to the multicast address "239.0.10.100". In similar fashion, the receiving control unit $44_1$ starts receiving the storage-type information JT transmitted to the multicast address "239.0.10.199", and stores (accumulates) the received storage-type information JT in the storage unit $43_1$ through the interface unit $47_1$. In step SZ3, the receiving control unit $44_1$, like in step SK3 (see FIG. 8), performs the process of synchronously reproducing the stream information JS and the storage-type information JT.

As explained above, according to the sixth embodiment, like in the first embodiment, the stream information JS and the storage-type information JT are both synchronously reproduced in the clients $40_1$ to $40_m$ under the control of the sync control server 30, and therefore as compared with the prior art in which only the stream information JS is reproduced in real time, an information distribution service with a high added value can be provided.

The first to sixth embodiments of the present invention were described in detail above with reference to the drawings. Specific examples of configuration, however, are not limited to the first to sixth embodiments but any design change or modifications not departing from the spirit and scope of the present invention are also included in the present invention.

Figure 14:
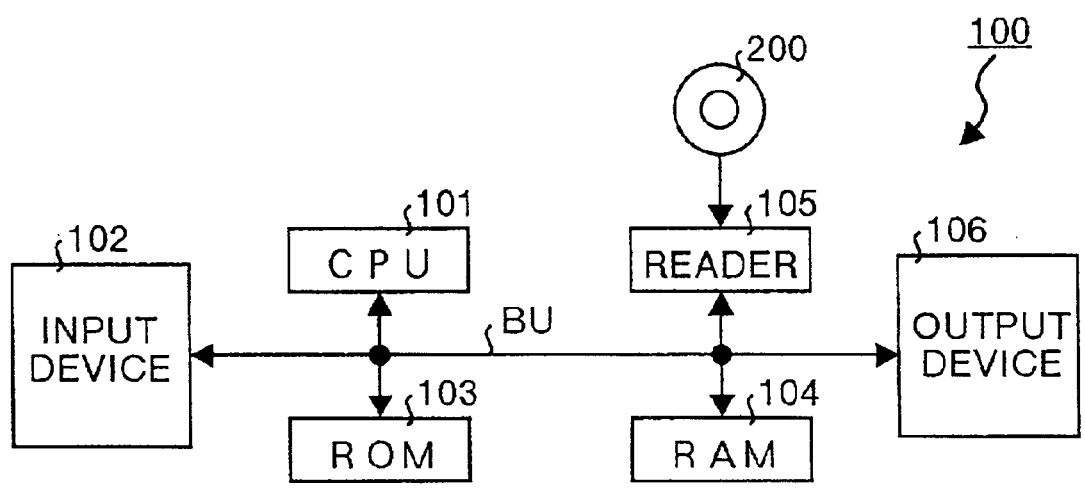
FIG. 14 is a block diagram showing a modification of the first to sixth embodiments of the present invention.

As an example, in the first to sixth embodiments described above, an information distribution control program or an information reproduction control program for realizing the functions described above is recorded in the computer readable recording medium 200 shown in FIG. 14, and the information distribution control program or the information reproduction control program recorded in the recording medium 200 can be executed by being read into the computer 100. The information distribution control program is a program for realizing the function of the sync control server 30 shown in FIG. 1, and the information reproduction control program is a program for executing the functions of the clients $40_1$ to $40_m$.

The computer 100 shown in FIG. 14 includes a CPU 101 for executing the information distribution control program (or the information reproduction control program) described above, an input device 102 such as a keyboard and a mouse, a ROM (read-only memory) 103 for storing various data, a RAM (random access memory) 104 for storing arithmetic parameters, etc., a reader 105 for reading the information distribution control program from the recording medium 200, an output device 106 such as a display unit and a printer, and a bus BU for connecting the various parts.

The CPU 101, after reading the information distribution control program from the recording medium 200 through the reader 105, executes the particular information distribution control program and thereby controls the distribution of the stream information JS and the storage-type information JT. Further, the CPU 101, after reading the information reproduction control program from the recording medium 200, executes the particular information reproduction control program and thereby synchronously reproduces the stream information JS and the storage-type information JT described above. The recording medium 200 includes a transmission medium such as a network for recording and holding data temporarily, as well as an optical disk, a floppy disk, a hard disk or the like portable recording medium.

In the examples described in the first to sixth embodiments, the multicast scheme is used as a communication method. The present invention, however, is not limited to such a scheme but any communication scheme can be employed as far as it is intended for synchronous reproduction of the stream information and the storage-type information. According to the first to sixth embodiments, therefore, instead of the multicast scheme, it is possible to employ a broadcast scheme (simultaneous broadcast communication scheme) for transmitting information to a multiplicity of unspecified clients at a time, or a unicast scheme (single-host transmission-type communication scheme) for transmitting information to a single client with equal effect.

Further, the first to sixth embodiments refer to the case of a configuration comprising one unit each of a stream server 10, a storage-type information server 20 and a sync control server 30. As an alternative, a plurality of stream servers 10, storage-type information servers 20 and sync control servers 30 can be provided to distribute the load among a plurality of units corresponding to the number of the clients $40_1$ to $40_m$.

Further, in the first to sixth embodiments, a plurality of stream servers 10 and a plurality of storage-type information servers 20 can be provided to distribute the stream information JS and the storage-type information JT for a plurality of types of contents.

In addition, according to the first to sixth embodiments, an explanation was made of a case using the storage-type information JT held on the stream server 10 side or on the storage-type information server 20 side. The present invention is not confined to such a case, but the storage-type information JT and the stream information JS may be synchronously reproduced by use of the storage-type information JT held in the WWW (world wide web).

As described above, according to one aspect of the present invention, the stream information and the storage-type information are both synchronously reproduced in the receivers, and therefore as compared with the prior art in which only the stream information is reproduced in real time, an information distribution service high in added value can be provided.

According to another aspect of the present invention, the storage-type information is held in the stream information distribution apparatus, so that the stream information and the storage-type information are both distributed from the same stream information distribution apparatus, and therefore the effect of transmission delay is reduced.

According to still another aspect of the present invention, the storage-type information is downloaded to the stream information distribution apparatus in advance, and the stream information and the storage-type information are distributed from the same stream information distribution apparatus. Therefore, the effect of transmission delay can be reduced.

According to still another aspect of the present invention, the stream information and the storage-type information are both synchronously reproduced in the receiver, and therefore as compared with the prior art in which only the stream information is reproduced in real time, an information distribution server with a higher added value can be provided. Further, the storage-type information is held in advance in the receivers, and therefore the transmission of the storage-type information is not required, thereby eliminating the effect of transmission delay.

According to still another aspect of the present invention, the storage-type information is downloaded beforehand to the receivers, and therefore the transmission of the storage-type information is not required, thereby eliminating the effect of transmission delay.

Although the invention has been described with respect to a specific embodiment for a complete and clear disclosure, the appended claims are not to be thus limited but are to be constructed as embodying all modifications and alternative

What is claimed is:

1. An information distribution control system comprising:
   a client that is connected to a network and is configured for receiving a stream information and a storage-type information;
   a stream server that is connected to the network and includes a stream information distribution apparatus for distributing the stream information in real time, by way of a first network control unit to the client through the network, and a first time-information addition control unit which adds a first time information to the stream information;
   a storage-type information server that is connected to the network for distributing the storage-type information to the client through the network;
   a second time-information addition control unit which adds a second time information to the storage-type information; and
   a sync control server that is connected to the network by way of a second network control unit and controls synchronization of the stream information and the storage-type information in the client through the network in such a manner as to produce the stream information and the storage-type information in temporal synchronism with each other based on the first time information and the second time information.

2. The information distribution control system according to claim 1,
   wherein the stream server further includes a storage unit for holding the storage-type information,
   wherein the second time-information addition control unit controls the stream server such that the second time information is added to the storage-type information at the stream server, and
   wherein the stream server distributes the stream information with the first time information added thereto and the storage-type information with the second time information added thereto to the client through the network.

3. The information distribution control system according to claim 2, further comprising:
   a download unit that downloads the storage-type information from a storage-type information server through the network to the stream server in advance of distribution of the storage-type information.

4. An information distribution control system comprising:
   a client that is connected to a network and is configured for receiving a stream information and a storage type information;
   a stream server that is connected to the network and includes a stream information distribution apparatus for distributing the stream information in real time, by way of a first network control unit to the client through the network, and a time information addition control unit which adds a first time information to the stream information; and
   a sync control server that is connected to the network by way of a second network control unit and controls synchronization of the stream information and the storage-type information in the client through the network in such a manner as to produce the stream information and the storage-type information held in the client, in temporal synchronism with each other based on the time information.

5. The information distribution control system according to claim 4, further comprising:
   a download unit which downloads the storage-type information from either one of a storage-type information server and the stream server to the client in advance of distribution of the storage-type information.

6. An information distribution control system comprising:
   a client that is connected to a network and is configured for receiving a stream information and a storage-type information;
   a stream server that is connected to the network and includes a stream information distribution apparatus for distributing the stream information in real time, by way of a first network control unit to the client through the network, and a first time-information addition control unit which adds a first time information to the stream information, wherein the stream server further includes a storage unit for storing a storage-type information;
   a storage-type information server that is connected to the network for distributing the storage-type information to the client through the network and includes a second time-information addition control unit which adds a second time information to the storage-type information;
   a download unit which downloads the storage-type information held in the storage unit in the stream server to the storage-type information server through the network in advance of distribution of the storage-type information; and
   a sync control server that is connected to the network by way of a second network control unit and controls synchronization of the stream information and the storage-type information in the client through the network in such a manner as to produce the stream information and the storage-type information in temporal synchronism with each other based on the first time information and the second time information.

7. An information distribution control method comprising the steps of:
   adding a first time information to a stream information distributed from a stream information distribution apparatus to a client through a network, the stream information being produced in real time;
   adding a second time information to a storage-type information distributed to the client through the network; and
   controlling synchronization of the stream information and the storage-type information in the client through the network in such a manner as to produce the stream information and the storage-type information in temporal synchronism with each other based on the first time information and the second time information.

8. A computer readable recording medium which records an information distribution control program for making a computer execute a process comprising the steps of:
   adding a first time information to a stream information being produced in real time and to be distributed from a stream server to a client through a network;
   adding a second time information to a storage-type information to be distributed to the client through the network; and
   controlling synchronization of the stream information and the storage-type information in said client through the network in such a manner as to produce the stream information and the storage-type information in temporal synchronism with each other based on the first time information and the second time information.

9. An information reproduction apparatus comprising:

a first client which receives a stream information with a first time information added thereto through a network and is produced in real time;

a second client which receives a storage-type information with a second time information added thereto through the network; and a sync control server which produces the stream information and the storage-type information in temporal synchronism with each other based on the first time information and the second time information, synchronization being controlled through the network.

10. A computer readable recording medium which records an information reproduction control program for making a computer execute a process comprising the steps of:

receiving a stream information with a first time information added thereto through a network and produced in real time;

receiving a storage-type information with a second time information added thereto through the network; and reproducing the stream information and the storage-type information in temporal synchronism with each other based on the first time information and the second time information, synchronization being controlled through the network.

* * * * *